US010013395B2

(12) United States Patent
Kajiwara et al.

(10) Patent No.: US 10,013,395 B2
(45) Date of Patent: Jul. 3, 2018

(54) APPARATUS, CONTROL METHOD THEREOF, AND STORAGE MEDIUM THAT DETERMINE A LAYOUT IMAGE FROM A GENERATED PLURALITY OF LAYOUT IMAGES BY EVALUATING SELECTED TARGET IMAGES

(71) Applicant: CANON KABUSHIKI KAISHA, Tokyo (JP)

(72) Inventors: Yuto Kajiwara, Kawasaki (JP); Hiroyuki Sakai, Chigasaki (JP); Yusuke Hashii, Tokyo (JP); Hiroyasu Kunieda, Yokohama (JP); Naoki Sumi, Kawasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/930,324

(22) Filed: Jun. 28, 2013

(65) Prior Publication Data

US 2014/0013213 A1    Jan. 9, 2014

(30) Foreign Application Priority Data

Jul. 9, 2012 (JP) ................................. 2012-154006

(51) Int. Cl.
*G06F 17/00* (2006.01)
*G06F 17/21* (2006.01)

(52) U.S. Cl.
CPC .................................. *G06F 17/212* (2013.01)

(58) Field of Classification Search
CPC ......... G06F 17/30265; G06F 17/30247; G06F 17/248
See application file for complete search history.

(56) References Cited

U.S. PATENT DOCUMENTS 5,218,387 A    6/1993  Ueno et al.
5,905,807 A    5/1999  Kado et al.
(Continued)

FOREIGN PATENT DOCUMENTS

JP    05-197793    8/1993
JP    08-63597     3/1996
(Continued)

OTHER PUBLICATIONS

U.S. Appl. No. 13/934,007, filed Jul. 2, 2013.
(Continued)

*Primary Examiner* — Scott Baderman
*Assistant Examiner* — Barbara Level
(74) *Attorney, Agent, or Firm* — Fitzpatrick, Cella, Harper & Scinto

(57) ABSTRACT

An apparatus includes a memory to store a program and a processor to execute the program stored in the memory. The processor selects randomly output target images from output target candidate images and generates a plurality of layout images, each of which is generated by laying out the selected output target image. A template includes at least one image layout area. The processor determines a layout image from the generated plurality of layout images, by evaluating the selected target images included in each of the generated plurality of layout images according to both of first information corresponding to a user's evaluations for each of the selected output target images and second information based on an output history of each of the selected output target images in accordance with user designations. The processor outputs the determined layout image.

28 Claims, 31 Drawing Sheets

(56) References Cited

U.S. PATENT DOCUMENTS

| | | |
|---|---|---|
| 6,885,760 B2 | 4/2005 | Yamada et al. |
| 6,895,103 B2 | 5/2005 | Chen et al. |
| 6,965,684 B2 | 11/2005 | Chen et al. |
| 7,103,218 B2 | 9/2006 | Chen et al. |
| 7,190,467 B2 | 3/2007 | Simpson et al. |
| 7,236,632 B2 * | 6/2007 | Erol et al. .................... 382/218 |
| 7,515,294 B2 | 4/2009 | Yamazoe et al. |
| 7,746,487 B2 | 6/2010 | Tsue et al. |
| 7,783,115 B2 | 8/2010 | Matsui et al. |
| 7,801,907 B2 | 9/2010 | Fischer et al. |
| 7,969,591 B2 | 6/2011 | Tsue et al. |
| 8,332,427 B2 * | 12/2012 | Whitby et al. ................ 707/772 |
| 8,571,331 B2 | 10/2013 | Cifarelli |
| 8,665,294 B2 | 3/2014 | Hirooka |
| 8,947,442 B2 | 2/2015 | Suehiro et al. |
| 9,049,419 B2 | 6/2015 | Cheatle |
| 9,436,707 B2 | 9/2016 | Kumar et al. |
| 2001/0014184 A1 | 8/2001 | Bubie et al. |
| 2003/0011801 A1 | 1/2003 | Simpson et al. |
| 2003/0189739 A1 | 10/2003 | Yamaguchi et al. |
| 2004/0049486 A1 * | 3/2004 | Scanlon et al. .................. 707/1 |
| 2004/0161224 A1 | 8/2004 | Yamazoe et al. |
| 2005/0111737 A1 * | 5/2005 | Das .................. G06T 11/60 382/190 |
| 2005/0168779 A1 | 8/2005 | Tsue et al. |
| 2006/0050312 A1 * | 3/2006 | Takiyama et al. .......... 358/1.15 |
| 2006/0224964 A1 * | 10/2006 | Schwartz et al. ............. 715/730 |
| 2007/0180355 A1 * | 8/2007 | McCall et al. .............. 715/501.1 |
| 2007/0186154 A1 * | 8/2007 | Anthony .......... G06F 17/30274 715/210 |
| 2007/0288462 A1 | 12/2007 | Fischer et al. |
| 2007/0291153 A1 * | 12/2007 | Araki et al. ............. 348/333.05 |
| 2008/0089590 A1 * | 4/2008 | Isomura et al. ............. 382/217 |
| 2008/0094420 A1 | 4/2008 | Geigel et al. |
| 2008/0123993 A1 * | 5/2008 | Widdowson .......... G06T 11/60 382/284 |
| 2008/0205789 A1 | 8/2008 | Ten Kate et al. |
| 2009/0049374 A1 * | 2/2009 | Echenberg .................... 715/249 |
| 2009/0074329 A1 * | 3/2009 | Chou et al. .................. 382/305 |
| 2009/0116752 A1 * | 5/2009 | Isomura et al. ............. 382/217 |
| 2009/0138788 A1 | 5/2009 | Hahn et al. |
| 2009/0199226 A1 | 8/2009 | Suehiro et al. |
| 2010/0067027 A1 | 3/2010 | Kunieda |
| 2010/0118052 A1 | 5/2010 | Tsue et al. |
| 2010/0260415 A1 | 10/2010 | Sakai et al. |
| 2010/0289818 A1 | 11/2010 | Hirooka |
| 2010/0293157 A1 * | 11/2010 | Ito ................................ 707/723 |
| 2010/0295998 A1 * | 11/2010 | Sakai et al. .................. 348/700 |
| 2011/0029562 A1 * | 2/2011 | Whitby et al. ................ 707/779 |
| 2011/0029635 A1 * | 2/2011 | Shkurko et al. .............. 709/217 |
| 2011/0129159 A1 | 6/2011 | Cifarelli |
| 2011/0213795 A1 * | 9/2011 | Lee .................. G06F 17/3028 707/769 |
| 2011/0270813 A1 * | 11/2011 | Cok et al. ..................... 707/705 |
| 2011/0280486 A1 * | 11/2011 | Wang ............................ 382/195 |
| 2012/0020576 A1 * | 1/2012 | Fry et al. ..................... 382/218 |
| 2012/0076427 A1 * | 3/2012 | Hibino et al. ................ 382/218 |
| 2012/0106859 A1 | 5/2012 | Cheatle |
| 2012/0210200 A1 * | 8/2012 | Berger et al. ................. 715/202 |
| 2013/0159924 A1 * | 6/2013 | Yates et al. .................. 715/790 |
| 2013/0246925 A1 * | 9/2013 | Ahuja et al. ................. 715/738 |
| 2014/0003648 A1 * | 1/2014 | Fedorovskaya et al. ..... 382/100 |
| 2014/0009796 A1 | 1/2014 | Kajiwara et al. |
| 2014/0096075 A1 | 4/2014 | King |
| 2015/0161174 A1 | 6/2015 | Kumar et al. |
| 2015/0228307 A1 | 8/2015 | Cabanero |

FOREIGN PATENT DOCUMENTS

| | | |
|---|---|---|
| JP | 08-077334 | 3/1996 |
| JP | 2541688 B2 | 10/1996 |
| JP | 11-053525 | 2/1999 |
| JP | 11-250267 | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 3469031 B2 | 11/2003 |
| JP | 2006-229682 A | 8/2006 |
| JP | 2006-279119 A | 10/2006 |
| JP | 2007-005886 A | 1/2007 |
| JP | 2008-529150 A | 7/2008 |
| JP | 2010-251999 A | 11/2010 |
| JP | 2010-273144 A | 12/2010 |
| WO | WO 2006079991 A2 * | 8/2006 ............ G06F 17/30 |

OTHER PUBLICATIONS

U.S. Appl. No. 13/926,499, filed Jun. 25, 2013.
U.S. Appl. No. 13/921,774, filed Jun. 19, 2013.
Japanese Office Action dated May 9, 2016, issued in corresponding Japanese Patent Application No. 2012-154006.
English translation of Japanese Official Action dated May 9, 2016, issued in corresponding Japanese Patent Application No. 2012-154006.

* cited by examiner

FIG. 10

| SENSING LARGE CLASSIFICATION | SENSING SMALL CLASSIFICATION | DATA TYPE | VALUE |
|---|---|---|---|
| IMAGE BASIC FEATURE AMOUNT | AVERAGE LUMINANCE | int | 0~255 |
| | AVERAGE CHROMA SATURATION | int | 0~255 |
| | AVERAGE HUE | int | 0~359 |
| FACE DETECTION | NUMBER OF PERSON'S FACES | int | 0~MAXFACE |
| | COORDINATE POSITION | int * 8 | 0~Width or Height |
| | AVERAGE Y IN FACE REGION | int | 0~255 |
| | AVERAGE Cb IN FACE REGION | int | −128~127 |
| | AVERAGE Cr IN FACE REGION | int | −128~127 |
| SCENE ANALYSIS | SCENE RESULT | char | Landscape<br>Nightscape<br>Portrait<br>Underexposure<br>Others |

F I G. 11

```
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
        </SensInfo>
        <UserInfo>
                <FavoriteRate>3</FavoriteRate>
                <ViewingTimes>5</ViewingTimes>
                <ImageRate>70</ImageRate>
                <PrintingTimes>3</PrintingTimes>
                <Event>Travel</Event>
        </UserInfo>
        ...
</IMAGEINFO>
```

F I G. 12

| CLASSIFICATION | CONTENTS | DATA TYPE | VALUE |
|---|---|---|---|
| IMAGE | MANUAL PREFERENCE DEGREE | int | 0~100 |
| | AUTOMATIC PREFERENCE DEGREE | int | 0~100 |
| | EVENT | char | "travel" "graduation" "wedding" |
| PERSON | NAME | char | "NAME" |
| | BIRTHDAY | char | YYYYMMDD |
| | RELATIONSHIP | char | "family" "" |

F I G. 13
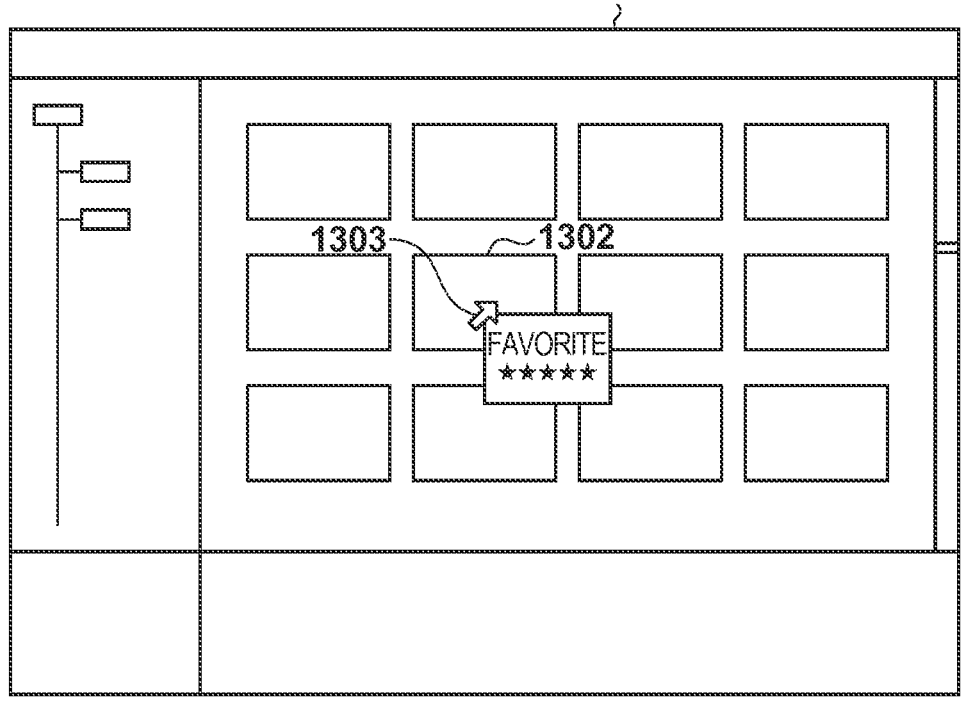
F I G. 14
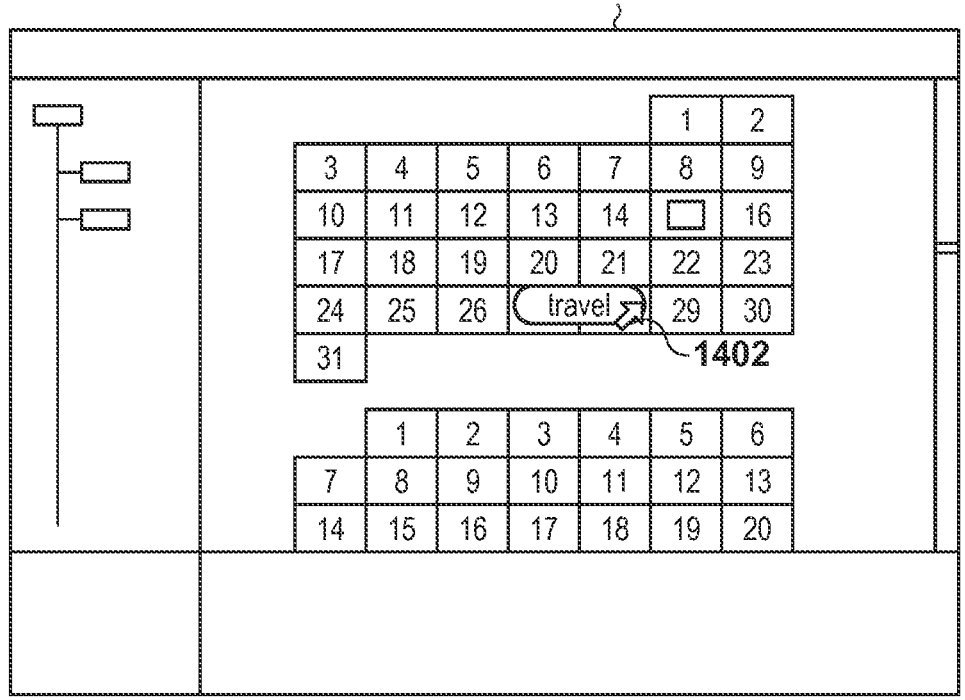

FIG. 18

```xml
<?xml version="1.0" encoding="utf-8" ?>
<LayoutInfo>
        <BASIC>
                        <Theme></Theme>
                        <PageSize>A4</PageSize>
                        <Resolution>300</Resolution>
        </BASIC>
        <ImageSlot>
                        <ID>0</ID>
                        <POSITION>
                                        <LeftTop x=100, y=200/>
                                        <LeftBottom x=100, y=800/>
                                        <RightTop x=1000, y=200/>
                                        <RightBottom x=1000, y=800/>
                        </POSITION>
                        <Shape>Rectangle</Shape>
                        <PersonGroup>MainGroup</PersonGroup>
        </ImageSlot>
        <ImageSlot>
                        <ID>1</ID>
                        <POSITION>
                                        <LeftTop x=800, y=700/>
                                        <LeftBottom x=800, y=1500/>
                                        <RightTop x=1700, y=700/>
                                        <RightBottom x=1700, y=1500/>
                        </POSITION>
                        <Shape>Rectangle</Shape>
                        <PersonGroup>MainGroup</PersonGroup>
        </ImageSlot>
        <ImageSlot>
                        <ID>2</ID>
                        <POSITION>
                                        <LeftTop x=300, y=1700/>
                                        <LeftBottom x=300, y=2300/>
                                        <RightTop x=1200, y=1700/>
                                        <RightBottom x=1200, y=2300/>
                        </POSITION>
                        <Shape>Rectangle</Shape>
                        <PersonGroup>MainGroup</PersonGroup>
        </ImageSlot>
</LayoutInfo>
```

FIG. 20

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

……

</LayoutInfo>
```

F I G. 24

| CATEGORY | CONTENTS | SCORE RANGE | THEME-DEPENDENT IMPORTANCE DEGREE (WEIGHT W) | | |
|---|---|---|---|---|---|
| | | | growth | travel | favorite |
| IMAGE-DEPENDENT EVALUATION | BRIGHTNESS ADEQUATE DEGREE | 0~100 | 0.5 | 1.0 | 0.0 |
| | CHROMA SATURATION ADEQUATE DEGREE | 0~100 | 0.5 | 1.0 | 0.0 |
| IMAGE/SLOT MATCHING DEGREE EVALUATION | PERSON MATCHING DEGREE | 0~100 | 1.0 | 0.5 | 0.0 |
| | TRIMMING OMISSION DETERMINATION | 0~100 | 1.0 | 0.5 | 0.0 |
| INTRA-PAGE BALANCE EVALUATION | IMAGE SIMILARITY | 0~100 | 0.5 | 1.0 | 0.0 |
| | TINCTURE VARIATION | 0~100 | 0.5 | 1.0 | 0.0 |
| | FACE SIZE VARIATION | 0~100 | 0.5 | 1.0 | 0.0 |
| OTHER | USER PREFERENCE | 0~100 | 0.8 | 0.8 | 1.0 |

FIG. 30

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

FIG. 31

```xml
<?xml version="1.0" encoding="utf-8" ?>
<LayoutInfo>
    <BASIC>
        <Theme>growth</Theme>
        <PageSize>A4</PageSize>
        <Resolution>300</Resolution>
        <MainGroup>son</MainGroup>
        <SubGroup>son, father</SubGroup>
    </BASIC>
    <ImageSlot>
        <ID>0</ID>
        <POSITION>
            <LeftTop x=400, y=900/>
            <LeftBottom x=400, y=1500/>
            <RightTop x=1300, y=900/>
            <RightBottom x=1300, y=1500/>
        </POSITION>
        <Shape>Rectangle</Shape>
        <PersonGroup>SubGroup</PersonGroup>
        <ImageID>0x00000001</ImageID>
        <TrimingRatio>50.0</TrimingRatio>
    </ImageSlot>
    <ImageSlot>
        <ID>1</ID>
        <POSITION>
            <LeftTop x=700, y=100/>
            <LeftBottom x=700, y=500/>
            <RightTop x=1100, y=100/>
            <RightBottom x=1100, y=500/>
        </POSITION>
        <Shape>ellipse</Shape>
        <PersonGroup>MainGroup</PersonGroup>
        <ImageID>0x00000089</ImageID>
        <TrimingRatio>38.0</TrimingRatio>
    <ImageSlot>
        <ID>2</ID>
        <POSITION>
            <LeftTop x=1100, y=200/>
            <LeftBottom x=1100, y=600/>
            <RightTop x=1450, y=200/>
            <RightBottom x=1450, y=600/>
        </POSITION>
        <Shape>ellipse</Shape>
        <PersonGroup>MainGroup</PersonGroup>
        <ImageID>0x00000129</ImageID>
        <TrimingRatio>53.0</TrimingRatio>
    </ImageSlot>
    ........

</LayoutInfo>
```

F I G. 33
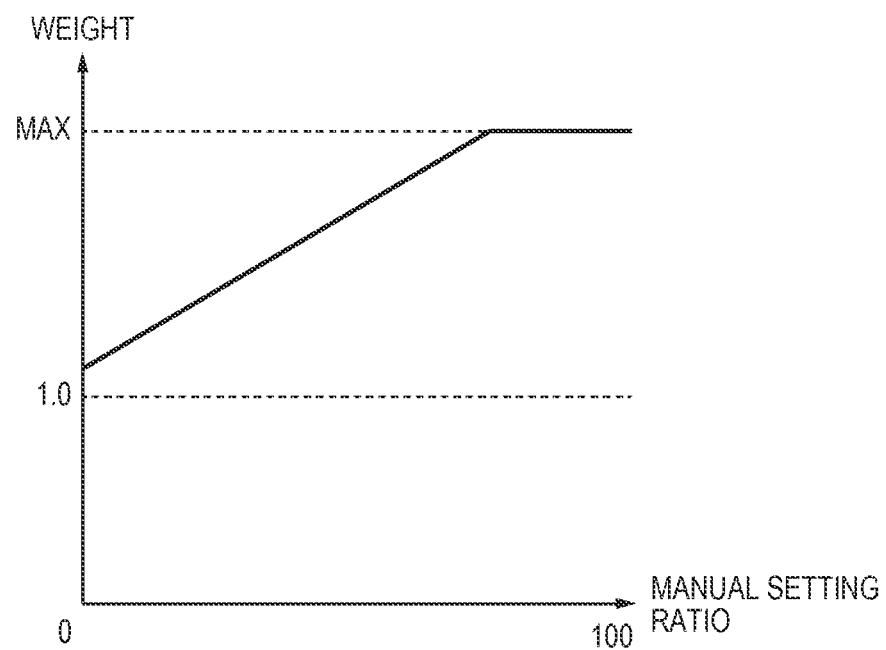
F I G. 34
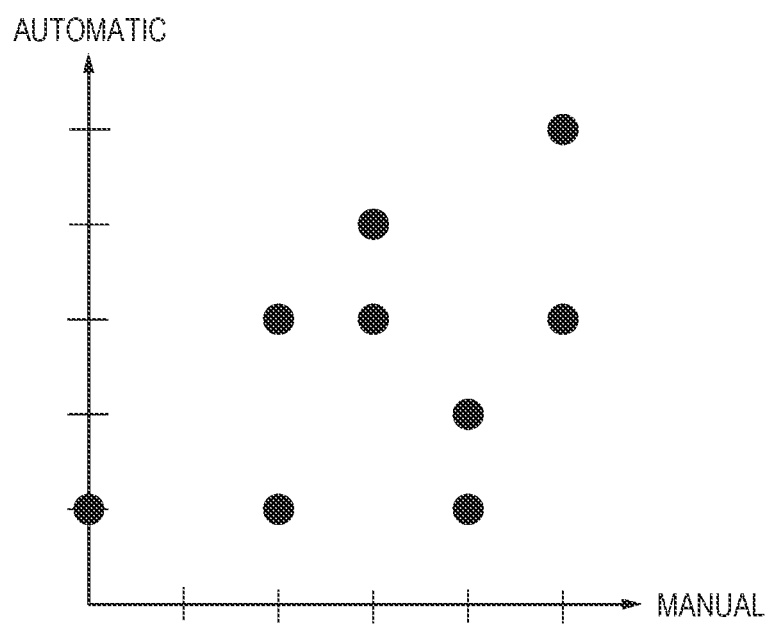

APPARATUS, CONTROL METHOD THEREOF, AND STORAGE MEDIUM THAT DETERMINE A LAYOUT IMAGE FROM A GENERATED PLURALITY OF LAYOUT IMAGES BY EVALUATING SELECTED TARGET IMAGES

This application claims the benefit of Japanese Patent Application No. 2012-154006, filed Jul. 9, 2012, which is hereby incorporated by reference herein in its entirety.

BACKGROUND OF THE INVENTION

Field of the Invention

The present invention relates to a technique for laying out images, which are stored and managed, according to a template.

Description of the Related Art

A technique for creating a photo album by laying out images on a template is known. Japanese Patent Laid-Open No. 2007-005886 describes a method that estimates images having larger numbers of display times and longer display times as those having higher importance degrees, and selecting those images.

However, the aforementioned conventional technique suffers the following problem.

Using only manual preference degrees as with the arrangement in the '886 document, a layout that really matches a user's preference cannot always be created. This is because manual preference degrees suffer slight errors depending on set timings. For example, when the user took photos in an event and set preference degrees on that day or set them some time later, evaluations include slight errors. This is because one determines manual preference degrees based on his or her sentiment at that time, and evaluations are not automatically determined. Therefore, even when the same preference degree is set for some images, actual preferences are often different, and although one likes images to similar degrees, different preference degrees are often set. That is, even when a layout using only manual preference degrees is created in disregard of this fact, it is created using images having higher preference degrees set by the user, and is not a layout preferred by the user.

SUMMARY OF THE INVENTION

Therefore, the present invention has been made in consideration of the aforementioned problems. Then, the present specification discloses a technique that can select appropriate images as output targets.

In order to solve the aforementioned problems, for example, according to this disclosure, an apparatus comprises an output unit configured to output an image in accordance with a user designation, and a determination unit configured to determine output target images according to both of first information that indicates a user's evaluations for output target candidate images, and second information based on output histories of the images in accordance with user designations.

According to the aforementioned arrangement, appropriate images can be selected as output targets.

Further features of the present invention will become apparent from the following description of exemplary embodiments (with reference to the attached drawings).

BRIEF DESCRIPTION OF THE DRAWINGS

FIG. 10 is a table showing an example of attribute information obtained as a result of image analysis;

FIG. 11 is a view showing a storage format of an image analysis result;

FIG. 12 is a table showing an example of attribute information that can be manually input by the user;

FIG. 13 is a view showing a UI example used to manually input a preference degree;

FIG. 14 is a view showing a UI example used to manually input event information;

FIG. 18 is a view showing an example of a holding format of the layout template shown in FIG. 17;

FIG. 20 is a view showing an example of a holding format of the layout template shown in FIG. 19;

FIG. 24 is a table showing an example of layout evaluation values upon execution of automatic layout processing;

FIG. 30 is a view showing a holding example of a determined theme and main character information;

FIG. 31 is a view showing a holding example of generated automatic layout information;

FIG. 33 is a graph showing a correspondence example between a manual setting ratio and weight;

FIG. 34 is a graph showing a plot example of preference degrees;

DESCRIPTION OF THE EMBODIMENTS

Embodiments according to the present invention will be described in detail hereafter with reference to the accompanying drawings.

First Embodiment

An embodiment in which images captured by a digital camera, or the like, are stored and managed, and a layout output matter is automatically generated using these images, will be described below. This is an example of one embodiment, and the present invention is not limited to the following embodiment.

Note that this embodiment assumes a collage output matter for one page as a layout output matter for the sake of simplicity, but album outputs for a plurality of pages may be adopted.

<Hardware Arrangement>

Figure 1:
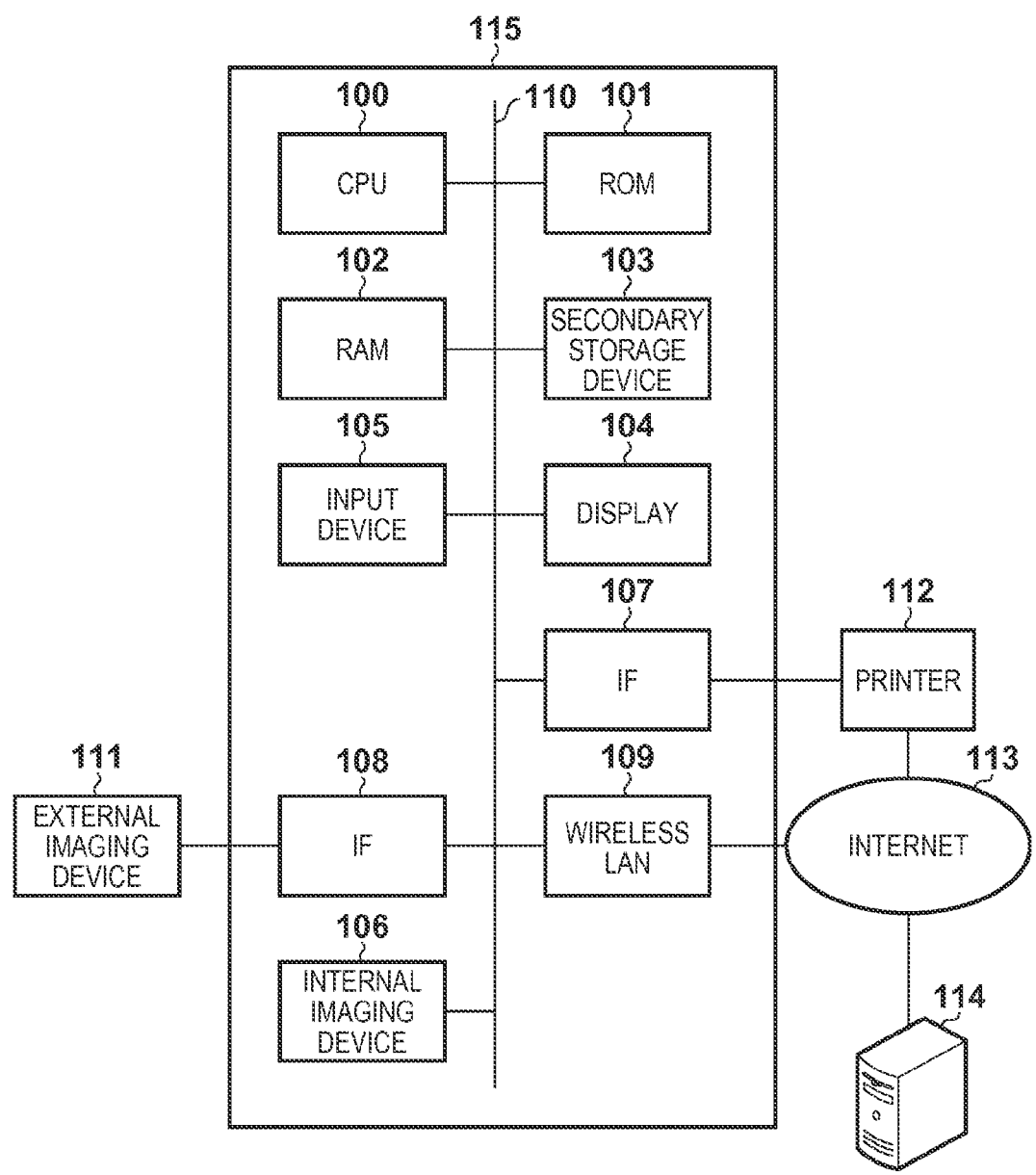
FIG. 1 is a block diagram showing the hardware arrangement that can execute software according to an embodiment.

FIG. 1 is a block diagram for explaining a hardware arrangement example of an information processing apparatus 115 according to the first embodiment. Referring to FIG. 1, reference numeral 100 denotes a CPU (Central Processing Unit), which executes an information processing method to be described in this embodiment according to a program. Reference numeral 101 denotes a ROM, which stores a BIOS program to be executed by the CPU 100. Reference numeral 102 denotes a RAM, which stores an OS and application to be executed by the CPU 100, and also functions as a work memory required to temporarily store various kinds of information by the CPU 100. Reference numeral 103 denotes a secondary storage device such as a hard disk, which is a storage medium which serves as a storage/holding function of an OS and various applications, an image storage function of storing image files to be stored and managed, and a database function of storing image analysis results. Reference numeral 104 denotes a display, which presents a processing result of this embodiment to the user. The display may include a touch panel function. Reference numeral 110 denotes a control bus/data bus, which connects the aforementioned units and the CPU 100. In addition, the information processing apparatus 115 also includes a user interface (UI) by means of an input device 105 such as a mouse and keyboard, which allow the user to input an image correction processing designation and the like.

The information processing apparatus 115 may include an internal imaging device 106. An image captured by the internal imaging device is stored in the secondary storage device 103 via predetermined image processing. Also, image data may be loaded from an external imaging device 111 connected via an interface (IF) 108. Furthermore, the information processing apparatus 115 includes a wireless LAN (Local Area Network) 109, which is connected to the Internet 113. Images can also be acquired from an external server 114 connected to the Internet.

Finally, a printer 112 used to output an image and the like is connected via an IF 107. Note that the printer is further connected on the Internet, and can exchange print data via the wireless LAN 109.

<Software Block Diagram>

Figure 2:
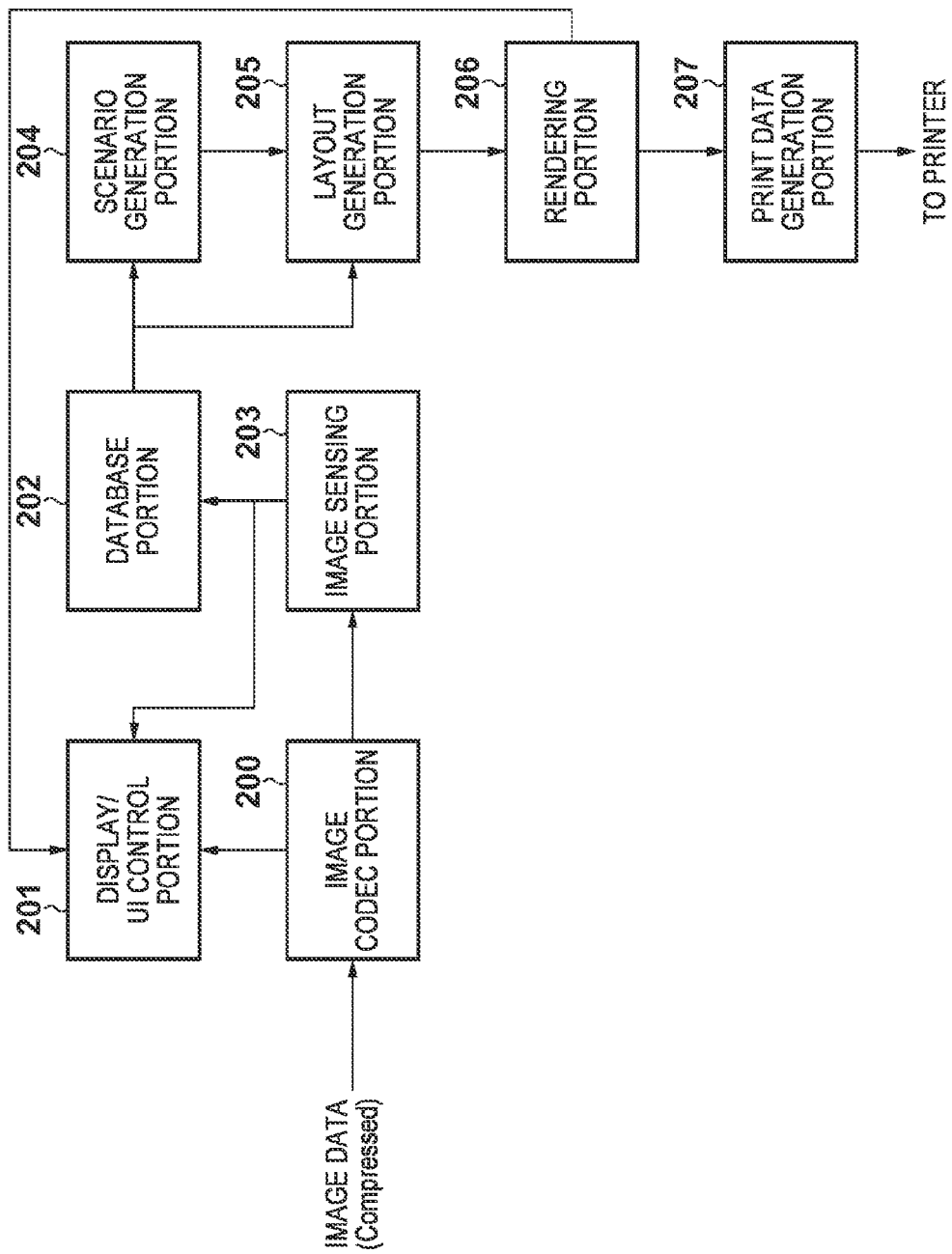
FIG. 2 is a software block diagram of processing according to the embodiment.

FIG. 2 is a block diagram of a basic software configuration to be executed by the CPU 100 of the information processing apparatus 115 according to this embodiment.

Image data, which is captured by a digital camera or the like, and is to be acquired by the information processing apparatus 115, normally has a compressed format such as JPEG (Joint Photography Expert Group). For this reason, an image codec portion 200 decompresses the compressed format to convert it into a so-called RGB dot-sequential bitmap data format. The converted bitmap data is transferred to a display/UI control portion 201, and is displayed on the display device 104 such as a display.

The bitmap data is further input to an image sensing portion 203, which executes various kinds of analysis processing (to be described in detail later) of an image. Various kinds of attribute information of the image obtained as a result of the analysis processing are stored in the aforementioned secondary storage device 103 by a database portion 202 according to a predetermined format. Note that in the following description, the image analysis processing is used synonymously with the sensing processing.

A scenario generation portion 204 generates conditions of a layout to be automatically generated according to various conditions input by the user (to be described in detail later). A layout generation portion 205 executes processing for automatically generating a layout according to the scenario.

A rendering portion 206 generates bitmap data required to display the generated layout, and sends the bitmap data to the display/UI control portion 201, thus displaying the result on the display. A rendering result is further sent to a print data generation portion 207, which converts the rendering result into printer command data. The printer command data is then output to the printer.

<Flowchart of Processing>

Flowcharts of most basic processing will be described below.

Figure 3:
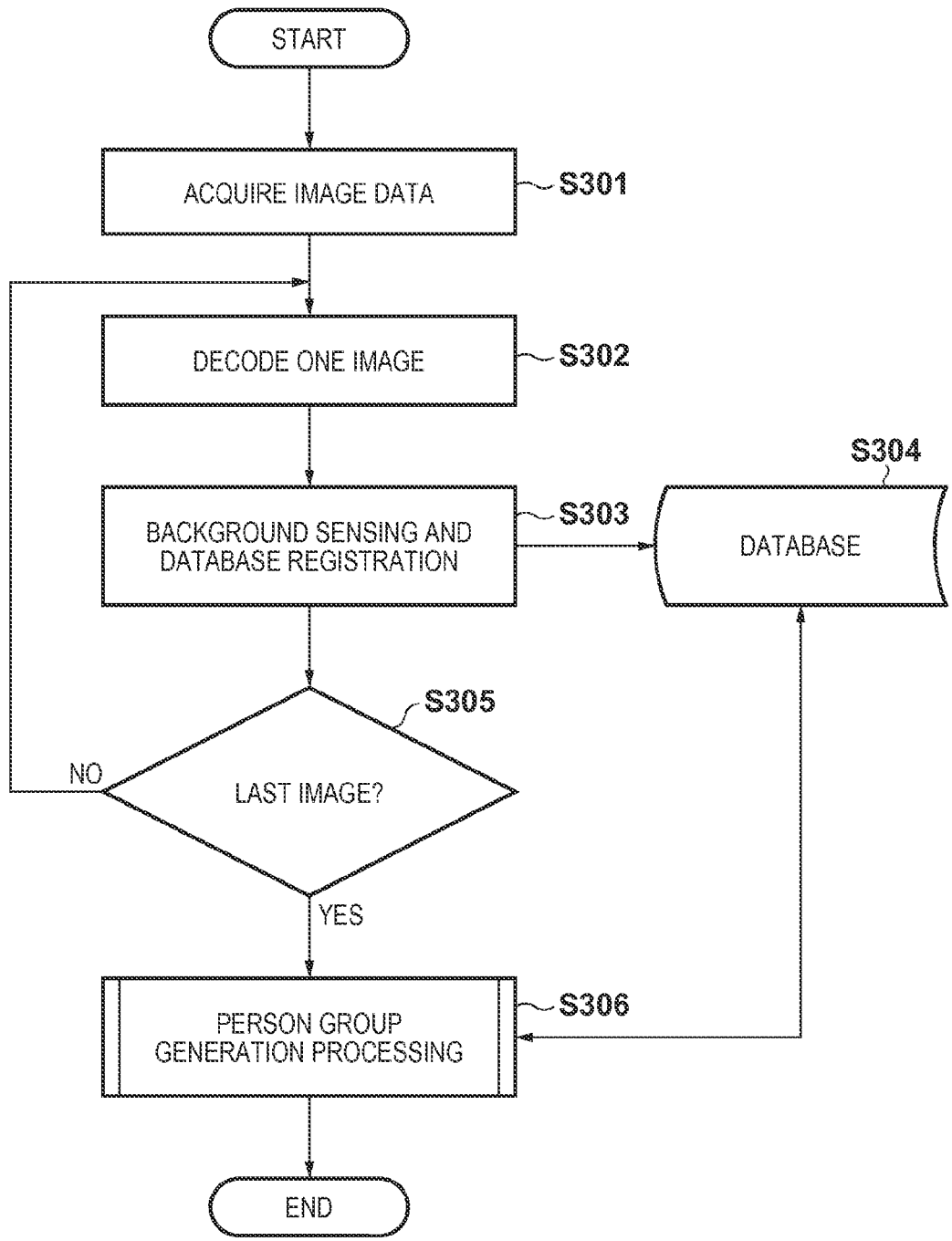
FIG. 3 is a flowchart of image analysis processing.
Figure 4:
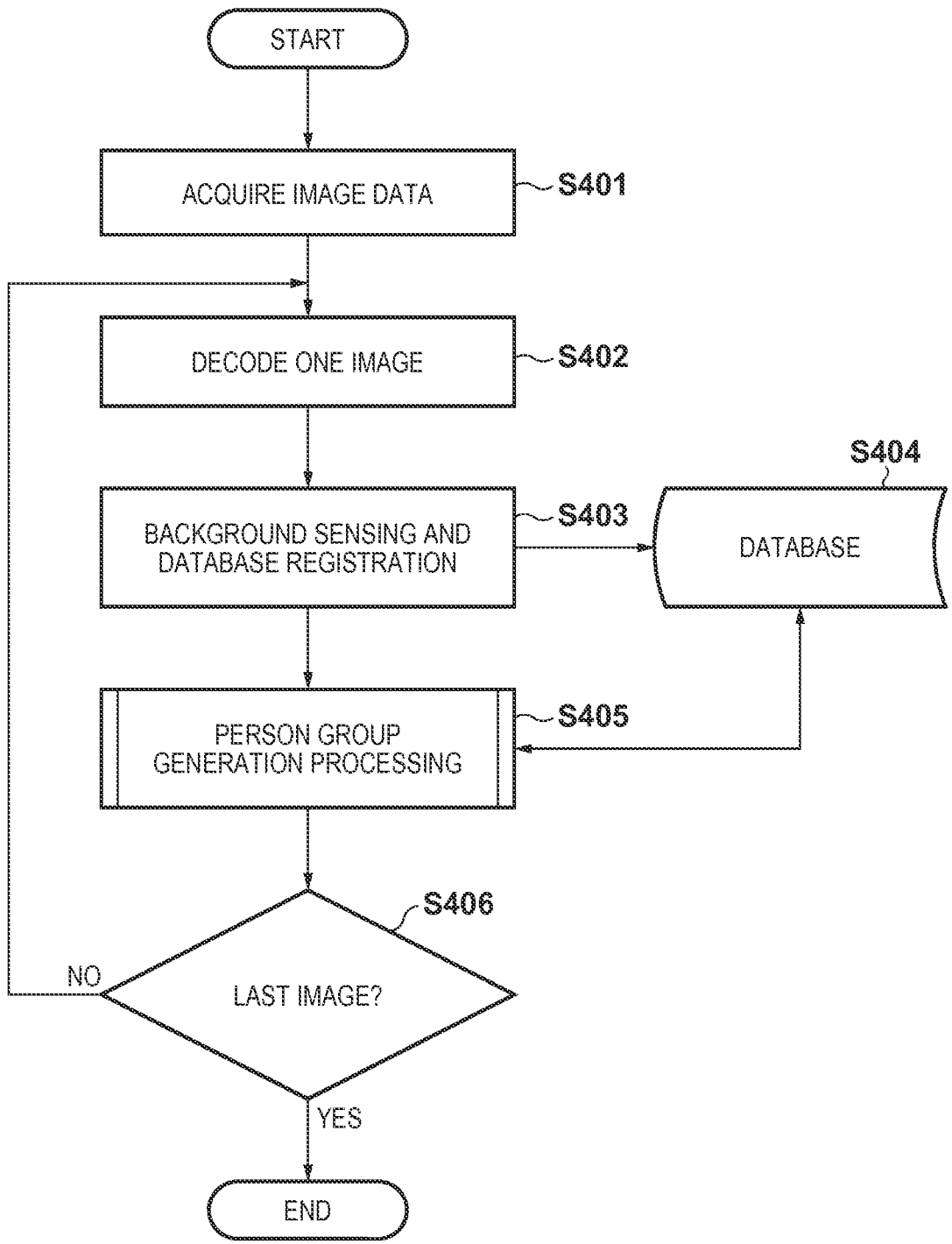
FIG. 4 is a flowchart of image analysis processing.
Figure 5:
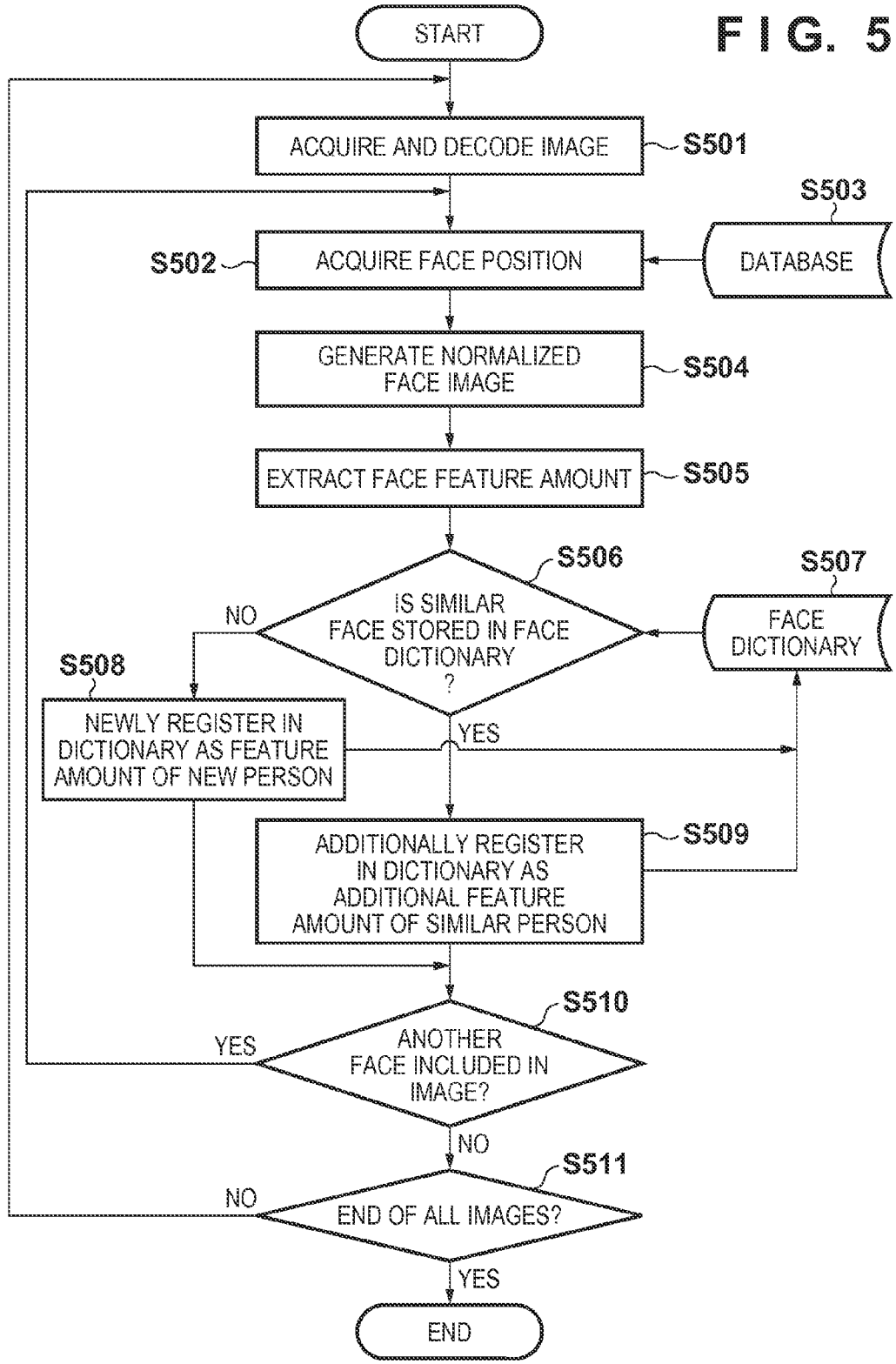
FIG. 5 is a flowchart of person group generation processing.
Figure 6:
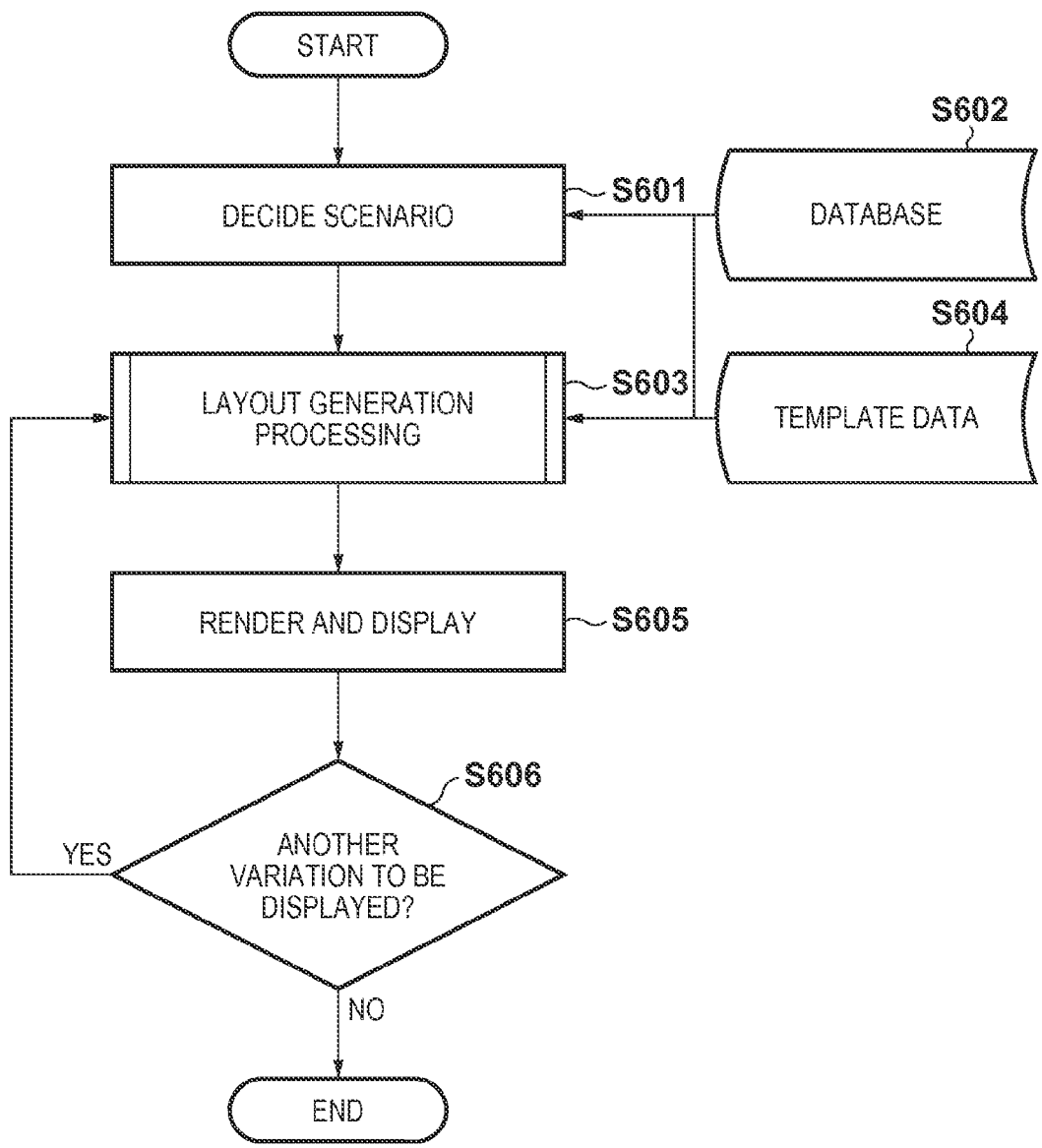
FIG. 6 is a flowchart of automatic layout proposal processing.

FIGS. 3 and 4 are flowcharts of the image sensing portion 203 and show processing sequences from when a plurality of image data is acquired until they respectively undergo analysis processing, and results are stored in a database. FIG. 5 shows the processing sequence required to group pieces of face information that seem to be the same person, based on detected face position information. FIG. 6 shows the processing sequence required to determine a scenario used to generate a layout based on image analysis information and various kinds of information input by the user, and to automatically generate a layout based on the scenario. Respective processes will be described below with reference to the flowcharts.

<Acquisition of Image>

In step S301 of FIG. 3, image data are acquired. The image data are acquired as follows. For example, when the user connects an imaging device or a memory card that stores captured images to the information processing apparatus 115, the captured images can be loaded. Also, images that are captured by the internal imaging device and are stored in the secondary storage device can also be loaded. Alternatively, the image data may be acquired from a location other than the local information apparatus 115 (for example, the external server 114 connected to the Internet).

Figure 8:
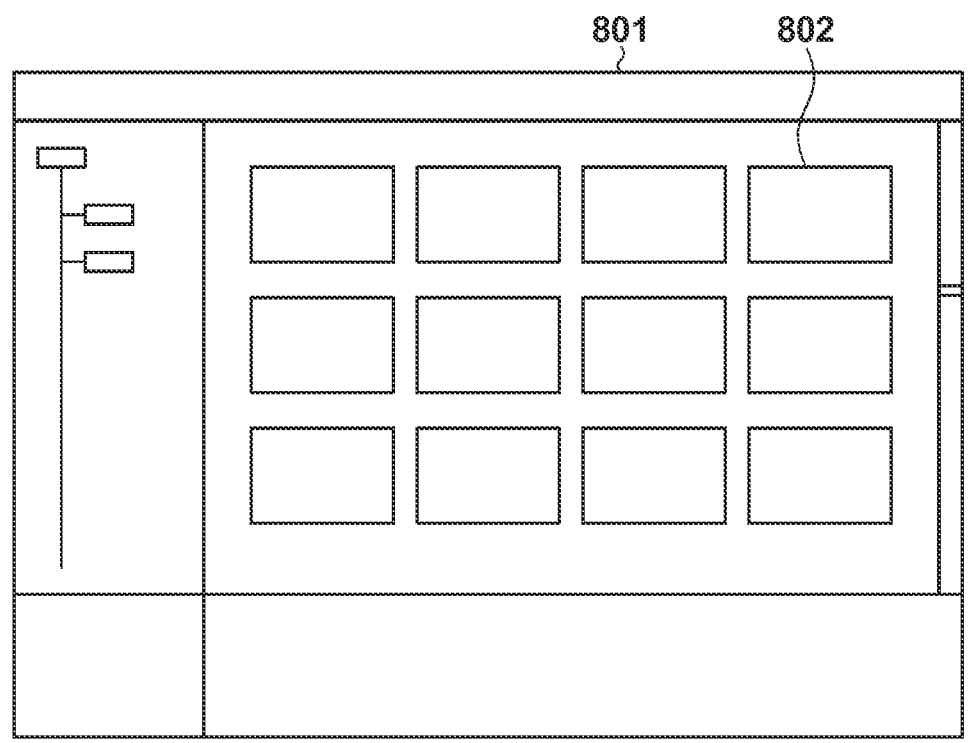
FIG. 8 is a view showing a display example of images in a thumbnail format.
Figure 9:
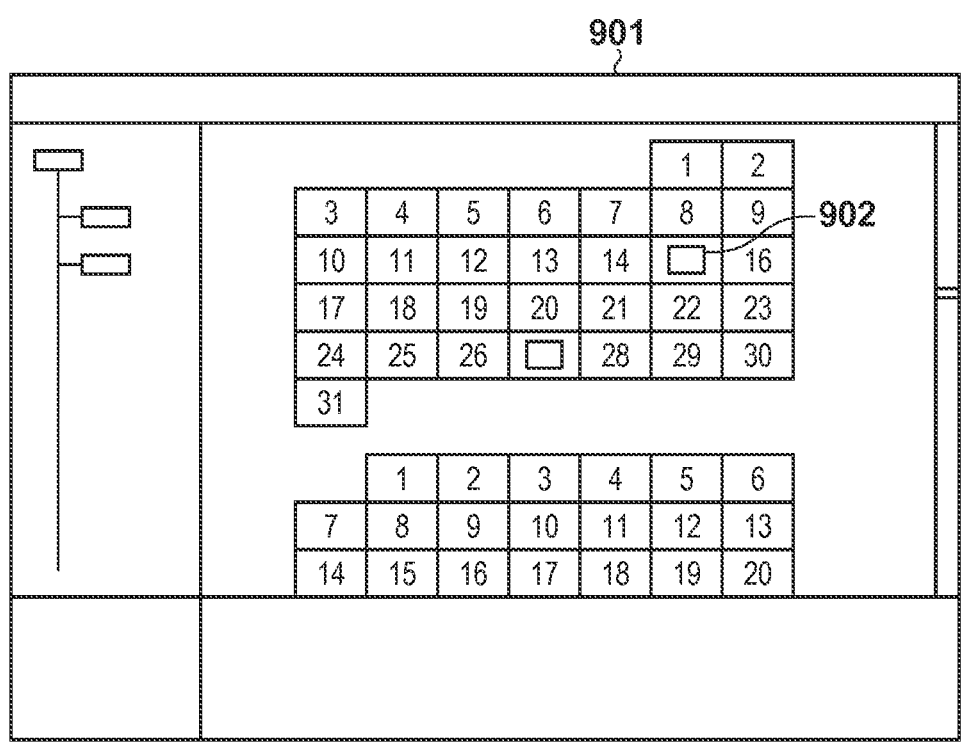
FIG. 9 is a view showing a display example of images in a calendar format.

After the image data are acquired, their thumbnails are displayed on a UI, as shown in FIGS. 8 and 9. Thumbnails 802 of images may be displayed for each folder in the secondary storage device, as denoted by reference numeral 801 in FIG. 8, or may be managed for respective dates on a UI 901 like a calendar, as shown in FIG. 9. Note that the calendar format shown in FIG. 9 displays a representative image having an earliest captured time as those captured on the same day. Also, when the user clicks a day part 902 on the UI 901 shown in FIG. 9, images captured on that day are displayed as a thumbnail list shown in FIG. 8.

<Background Sensing & DB Registration>

Analysis processing of the acquired image data and database registration processing of analysis results will be described below with reference to the flowchart shown in FIG. 3.

An application acquires a plurality of image data to be processed in step S301. Then, in step S302, the application searches new images to be stored for images which have not undergone sensing processing yet, and the codec unit converts compressed data of extracted images into bitmap data.

Next, in step S303, various kinds of sensing processing are executed for the bitmap data. As the sensing processing in this step, various kinds of processing shown in FIG. 10 are assumed. In this embodiment, as an example of the sensing processing, face detection/face region feature amount analysis, image feature amount analysis, and scene analysis are executed, and respectively calculate results of data types shown in FIG. 10. Respective kinds of sensing processing will be described below.

Since an entire average luminance and average chroma saturation as basic feature amounts of an image can be calculated by known methods, a detailed description thereof will not be given. As an overview, RGB components of respective pixel of an image can be converted into known luminance/color difference components (for example, YCbCr components) (conversion formulas are not shown), and an average value of Y components can be calculated. As for the average chroma saturation, a value S can be calculated for CbCr components of each pixel, and an average value of the values S can be calculated. The value S is calculated by:

$$S=(Cb^2+Cr^2)^{1/2}$$

As a feature amount used to evaluate a tincture of an image, an average hue AveH in the image may be calculated. A hue value for each pixel can be calculated using a known HIS conversion formula, and these hue values are averaged for the entire image, thus calculating AveH.

The feature amounts need not be calculated only for the entire image. For example, an image may be divided into regions each having a predetermined size, and the feature amounts may be calculated for each region.

Next, person's face detection processing will be described below. As a person's face detection method used in this embodiment, various methods have already been proposed. For example, Japanese Patent Laid-Open No. 2002-183731 describes the following method. That is, eye regions are detected from an input image, and a region around the eye regions is extracted as a face candidate region.

For this face candidate region, luminance gradients for respective pixels and weights of the luminance gradients are calculated, and these values are compared with gradients and weights of the gradients of an ideal face reference image, which is set in advance. At this time, when an average angle between respective gradients is not more than a predetermined threshold, it is determined that an input image has a face region.

Also, according to Japanese Patent Laid-Open No. 2003-30667, a flesh color region is detected from an image, and human iris color pixels are detected in that region, thus allowing detection of eye positions.

Furthermore, according to Japanese Patent Laid-Open No. 8-63597, matching degrees between a plurality of templates having face shapes and an image are calculated. A template having the highest matching degree is selected, and when the highest matching degree is not less than a predetermined threshold, a region in the selected template is detected as a face candidate region. Using that template, eye positions can be detected.

Moreover, according to Japanese Patent Laid-Open No. 2000-105829, an entire image or a designated region in the image is scanned using a nose image pattern as a template, and a most matched position is output as a nose position. Next, a region above the nose position of the image is considered as that including eyes, and the eye including region is scanned using an eye image pattern to calculate matching degrees, thus calculating an eye including candidate position set as a set of pixels having matching degrees larger than a certain threshold. Furthermore, continuous regions included in the eye including candidate position set are divided as clusters, and distances between the clusters and nose position are calculated. A cluster having the shortest distance is determined as that including eyes, thus allowing to detect organ positions.

In addition, as methods of detecting a face and organ positions, Japanese Patent Laid-Open Nos. 8-77334, 2001-216515, 5-197793, 11-53525, 2000-132688, 2000-235648, and 11-250267 are available. Furthermore, many methods such as Japanese Patent No. 2541688 have been proposed. In this embodiment, the method is not particularly limited.

As a result of the processing, the number of person's faces and coordinate positions for respective faces in an image can be acquired for each input image. When face coordinate positions in an image can be detected, an average YCbCr value of pixel values included in each face region can be calculated, and average luminance and average color differences of that face region can be obtained.

Also, scene analysis processing can be executed using feature amounts of an image. The scene analysis processing may use, for example, techniques disclosed in Japanese Patent Laid-Open Nos. 2010-251999 and 2010-273144 by the present applicant. Note that a detailed description of these techniques will not be given. As a result of the scene analysis, IDs used to distinguish imaging scenes such as "Landscape", "Nightscape", "Portrait", "Underexposure", and "Others" from each other can be acquired for respective images.

The application stores the sensing information acquired as described above in the database portion 202 in step S304. Then, the application repeats the processing until it is determined in step S305 that processing is complete for all images to be processed.

As a storage format in the database, for example, the sensing information may be described and stored using a versatile format (XML: eXtensible Markup Language) shown in FIG. 11.

FIG. 11 shows an example in which pieces of attribute information for respective images are described while being classified into three categories. A first BaseInfo tag indicates information appended in advance to an acquired image file as an image size and captured time information. This field includes an identifier ID of each image, a storage location where the image file is stored, a file name, an image size, a captured date and time, and the like.

A second SensInfo tag is required to store the aforementioned image analysis processing results. An average luminance, average chroma saturation, average hue, and scene analysis result of the entire image are stored, and information associated with a face position and face color of a person included in the image can be further described.

Then, a third UserInfo tag can store information input by the user for each image, and details will be described later.

Note that the database storage method of the image attribute information is not limited to the above method. Any other known formats may be used.

<Person Grouping Using Personal Recognition Processing>

Next, in step S306 of FIG. 3, processing for generating groups for respective persons using the face position information detected in step S303 is executed. By automatically grouping person's faces in advance, the user can efficiently name respective persons later.

Person group formation is executed by the processing sequence shown in FIG. 5 using a known personal recognition technique.

Note that the personal recognition technique mainly includes two techniques, that is, feature amount extraction of organs such as eyes and mouth included in a face and comparison of similarities of their relations. Since these techniques are disclosed in Japanese Patent No. 3469031 and the like, a detailed description thereof will not be given. Note that the aforementioned technique is an example, and various other methods may be used.

FIG. 5 is a basic flowchart of person group generation processing in step S306.

Initially, in step S501, an image stored in the secondary storage device is sequentially read out and decoded. Furthermore, in step S502, a database S503 is accessed to acquire the number of faces included in the image and position information of each face. In step S504, normalized face images required to execute personal recognition processing are generated.

Note that the normalized face images are face images obtained by extracting faces which are included in the image and have various sizes, directions, and resolutions and converting all of these faces to have a predetermined size and direction. In order to execute personal recognition, since positions of organs such as eyes and a mouth are important, each normalized face image has a size that allows the organs to be surely recognized. By preparing the normalized face images in this way, feature amount detection processing need not cope with faces having various resolutions.

In step S505, face feature amounts are calculated from the normalized face images. The face feature amounts are characterized by including positions and sizes of organs such as eyes, a mouth, and a nose, a face contour, and the like.

Furthermore, it is determined in step S506 whether or not the calculated feature amounts are similar to those of a database S507 (to be referred to as a face dictionary hereinafter) which stores face feature amounts prepared in advance for each person identifier (ID). As a result of determination, if YES in step S506, the calculated face feature amounts are added to the same person identifier (ID) in the dictionary as the same person in step S509.

If NO is determined in step S506, it is determined that the current face to be evaluated is that of a person different from those registered in the face dictionary, and a new person ID is issued and added to the face dictionary S507. The processes of steps S502 to S509 are repeated until it is determined in step S510 that the processes are complete for all face regions detected from one image. Then, the processes of step S501 and subsequent steps are repeated until it is determined in step S511 that the processes are complete for all images, thus grouping persons included in the images.

As a result of the above processes, images including a person X, those including a person Y, . . . , can be grouped. Note that one image may include a plurality of persons. In this case, one image is shared by a plurality of person identifiers.

The grouping results are described using ID tags for respective faces in an XML format, and are stored in the aforementioned database S304.

Note that in this embodiment, the person group generation processing is executed after completion of the sensing processing of images, as shown in FIG. 3. However, the present invention is not limited to this. For example, as shown in FIG. 4, after the sensing processing is executed for each image in step S403, the grouping processing is executed using face detected position information in step S405, thus generating the same result. Note that steps S401 to S406 in FIG. 4 respectively correspond to steps S301 to S306 in FIG. 3.

Figure 7:
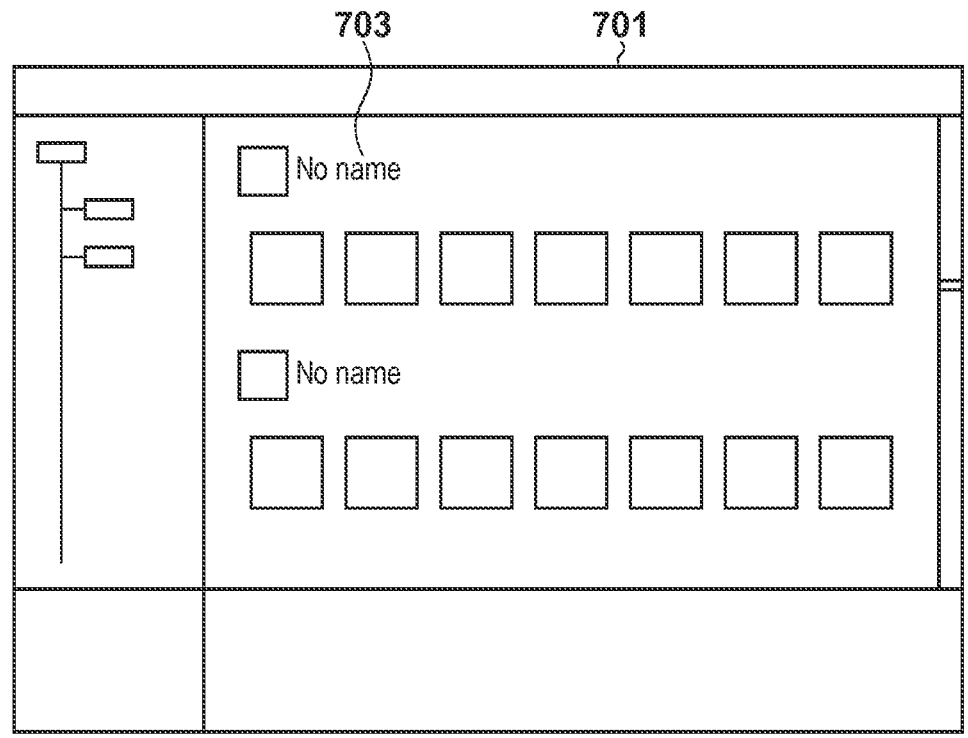
FIG. 7 is a view showing a display example of a person group.

The respective person groups obtained by the aforementioned processing are displayed using a UI 701 shown in FIG. 7. Referring to FIG. 7, reference numeral 702 denotes a representative face image of a person group, and a field 703 which displays a name of that person group is laid out beside the image 702. Immediately after completion of the automatic person grouping processing, a person name "No name" is displayed, as shown in FIG. 7. Reference numeral 704 denotes a plurality of face images included in that person group. As will be described later, on the UI shown in FIG. 7, the user can input a proper person name and information such as a birthday and relationship for each person by designating the "No name" field 703 using a pointing device.

The sensing processing may use a background task of an operating system without being perceived by the user who operates the information processing apparatus 115. In this case, even when the user carries out a different task on the computer, the sensing processing of images can be continued.

<Input of User Information (Person Name, Birthday, Preference Degree, etc.)>

This embodiment also assumes that the user manually inputs various kinds of attribute information associated with images.

FIG. 12 shows a list of an example of attribute information (to be referred to as manual registration information hereafter). The manual registration information is roughly classified into information to be set for each image, and that to be set for each person grouped by the aforementioned processing.

A user's preference degree (first information) is to be set for each image. As the preference degree, the user directly inputs information indicating whether or not he or she likes that image step by step using a pointing device such as a mouse. For example, as shown in FIG. 13, the user selects a desired thumbnail image 1302 using a mouse pointer 1303 on a UI 1301, and clicks a right mouse button, thereby displaying a dialog which allows the user to input a preference degree. The user can select the number of ★'s according to his or her preference. In this embodiment, as the preference degree is higher, the number of ★'s is set to be increased. Then, a score ranging from 0 to 100 is set as the preference degree according to the ★ value. This preference degree can be described as "manual" information since the user explicitly sets the number of ★'s using a mouse or keyboard.

In place of the preference degree, an "interest degree" (second information) which indicates how much the user is interested in that image without any designation is set. This interest degree is calculated using an access count in accordance with image browse request designations, an image evaluation value, and the like. A browse count corresponds to a transition count, for example, when the user clicks a desired image file in a displayed image thumbnail list shown in FIG. 8 to transit the current screen to a one-image display screen. A score ranging from 0 to 100 is set according to the transition count. That is, as the browse count is larger, it is judged that the user likes that image. The interest degree represented by this browse count assumes a higher value as the access count increases unlike the preference degree described above, and is automatically updated by accesses. Therefore, this interest degree can also be described as "automatic preference degree".

Figure 16:
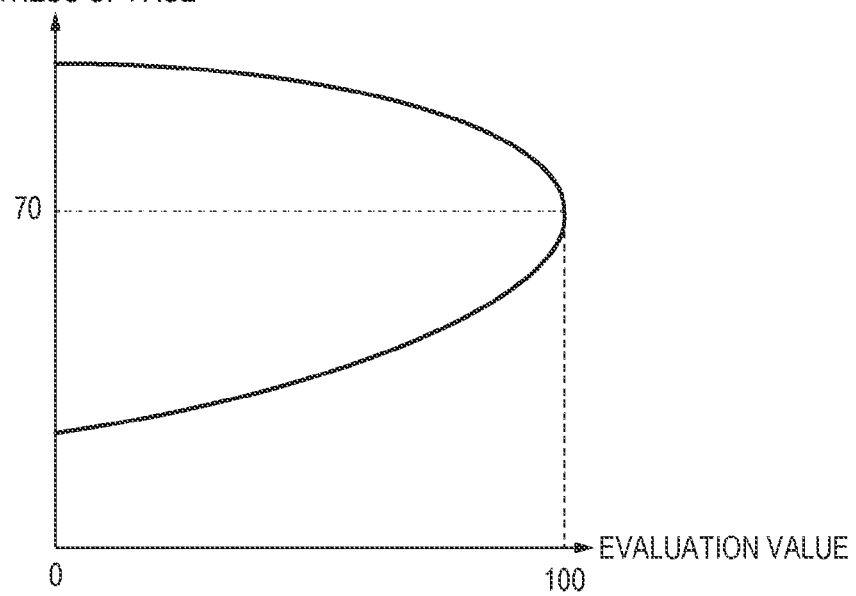
FIG. 16 is a graph showing a correspondence example between a brightness of a face and an image evaluation value.
Figure 28:
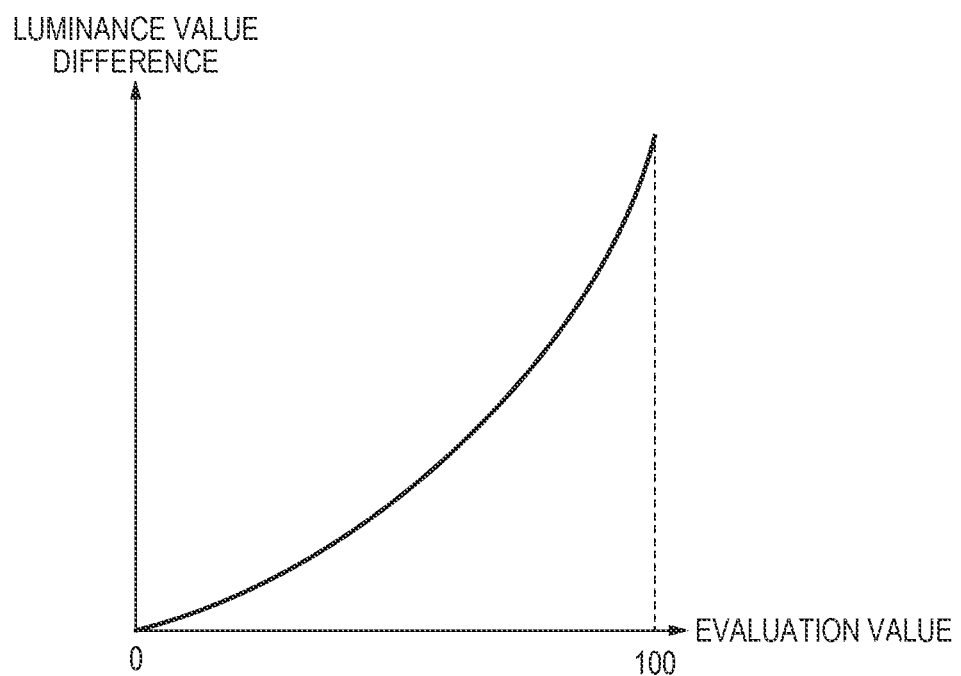
FIG. 28 is a graph showing a correspondence example between a luminance value difference and an image evaluation value after blurring processing.

Likewise, an evaluation value of an image is calculated as a score ranging from 0 to 100. For example, in case of an image of a person, a face brightness value is calculated. When this value indicates a good value, as shown in FIG. 16, it is estimated that the image is determined as a good image, and the user likes it, thus setting a high score. In addition, in order to determine whether or not an image is blurred, blurring processing is applied to the image, and luminance value differences between the image after the blurring processing and the original image are calculated to determine whether or not that image is a good image. As the differences are larger, as shown in FIG. 28, it is judged that the image is not blurred, and is a good image, thus setting a higher score. In this manner, evaluation values of an image are calculated using various methods.

In addition, as an element used to calculate an automatic preference degree (interest degree), a print count can also be used. When the user makes a print operation of an image, it is judged that he or she likes that image. By measuring a print count, a higher preference degree can be determined.

In this manner, all elements of an automatic preference degree are calculated using scores ranging from 0 to 100, and an average value of the respective elements is finally calculated, thus determining the automatic preference degree. In this manner, scores ranging from 0 to 100 are manually and automatically set, thus understanding a score intentionally set by the user and an automatically set score on the same scale.

As described above, the method of manually setting the preference degree by the user, and the method of automatically setting the preference degree based on image information such as a browse count, image evaluation value, and print count are available. The pieces of set and measured information are individually stored in association with a corresponding image file (an image file "IMG0001.jpg" in FIG. 11) in a UserInfo tag of the database portion 202 in an XML format shown in FIG. 11. For example, the preference degree is expressed using a FavoriteRate tag, the browse count is expressed using a ViewingTimes tag, the image evaluation value is expressed using an ImageRate tag, and the print count is expressed using a PrintingTimes tag.

As another information to be set for each image, event information may be used. The event information indicates, for example, "travel", "graduation", or "wedding".

The user may designate an event by designating a desired date on a calendar using a mouse pointer 1402 or the like, and inputting an event name of that day, as shown in FIG. 14. The designated event name is included in the XML format shown in FIG. 11 as a part of image attribute information. In the format shown in FIG. 11, the event name and image are linked using an Event tag in the UserInfo tag.

Person attribute information as another manual setting information will be described below.

Figure 15:
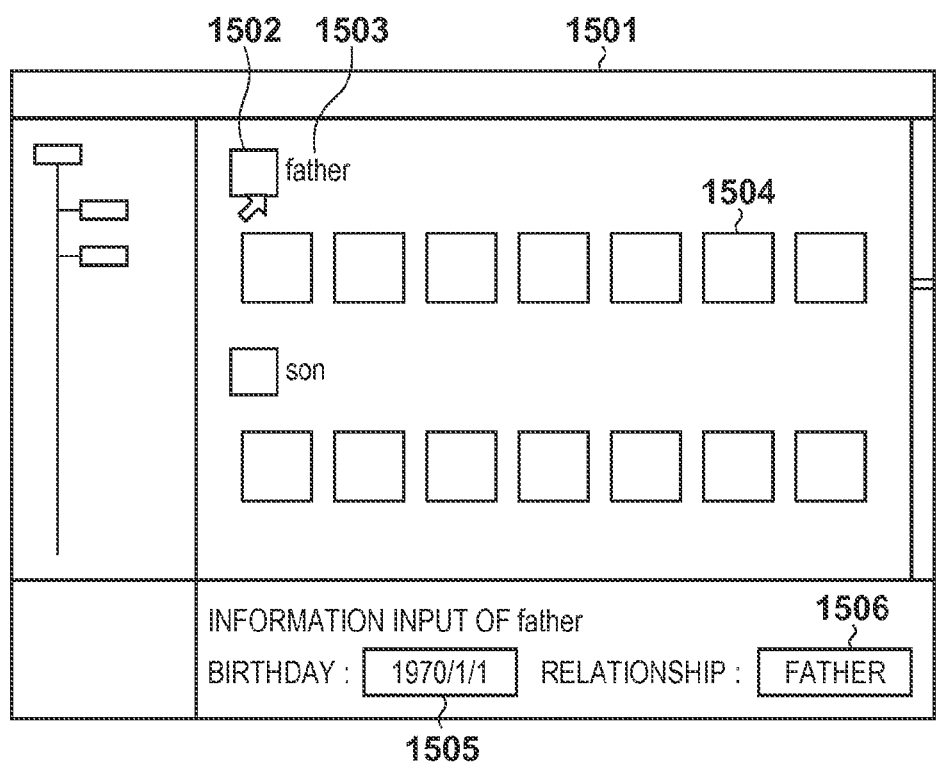
FIG. 15 is a view showing a UI example used to manually input person attribute information.

FIG. 15 shows a UI 1501 used to input person attribute information. Referring to FIG. 15, reference numeral 1502 denotes a representative face image of a predetermined person ("father" in this case). Reference numeral 1503 denotes a character string ("father" in FIG. 15) which is set by the user to specify the person. A list 1504 displays images which are detected from other images and are judged in step S506 to have similar face feature amounts to those of the person "father".

Immediately after completion of the sensing processing, a GUI 701 shown in FIG. 7 is displayed. On this GUI 701, no name is input to each person group. By designating a "No name" portion 703 using a mouse pointer, an arbitrary person name can be input.

As attributes for each person, a birthday of that person and a relationship viewed from the user who operates the application can also be set. When the user clicks the representative image 1502 of the person in FIG. 15, he or she can input a birthday 1505 and relationship information 1506 of the clicked person, as shown in a lower portion of a screen.

The input person attribute information is managed in the database portion 202 in the XML format independently of the aforementioned image attribute information linked with images.

<Acquisition of Template>

This embodiment assumes that various layout templates are prepared in advance. Layout templates are as denoted by reference numerals 1701 and 1901 in FIGS. 17 and 19, and have configurations in which a plurality of image layout frames 1702, 1902, and 1903 (to be used synonymously with "slots" hereafter) are laid out on a paper size to be laid out.

A large number of templates are prepared, and can be stored in the secondary storage device when software required to execute this embodiment is installed in the information processing apparatus 115. As another method, arbitrary templates may be acquired from the server 114 on the Internet, which is connected via the IF 107 and wireless LAN 109.

Assume that these templates are described using a versatile page description language, for example, XML, in the same manner as storage of the aforementioned sensing results. FIGS. 18 and 20 show examples of XML data. In FIGS. 18 and 20, basic information of a layout page is described in a BASIC tag. The basic information includes, for example, a theme and a page size of the layout, a resolution (dpi) of a page, and the like. In FIGS. 18 and 20, a Theme tag as a layout theme is blank in an initial state of a template. As the basic information, a page size=A4 and a resolution=300 dpi are set.

Figure 19:
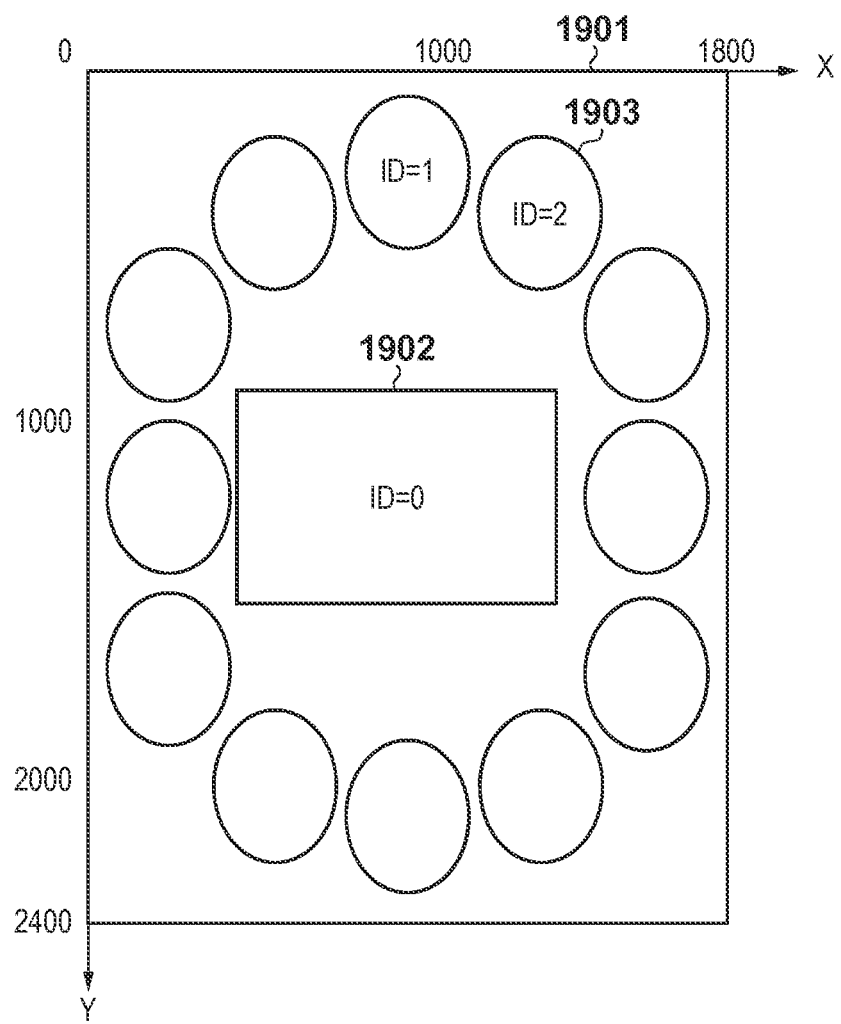
FIG. 19 is a view showing an example of a layout template.

Then, information of the aforementioned image layout frames is described in each ImageSlot tag. The ImageSlot tag holds two tags, that is, an ID tag and POSITION tag to describe an ID and position of the image layout frame. Assume that the position information is defined on, for example, an X-Y coordinate system having an upper left corner as an origin, as shown in FIGS. 17 and 19.

In each ImageSlot tag, a slot shape and a recommended person group name to be laid out can also be set for each slot.

Figure 17:
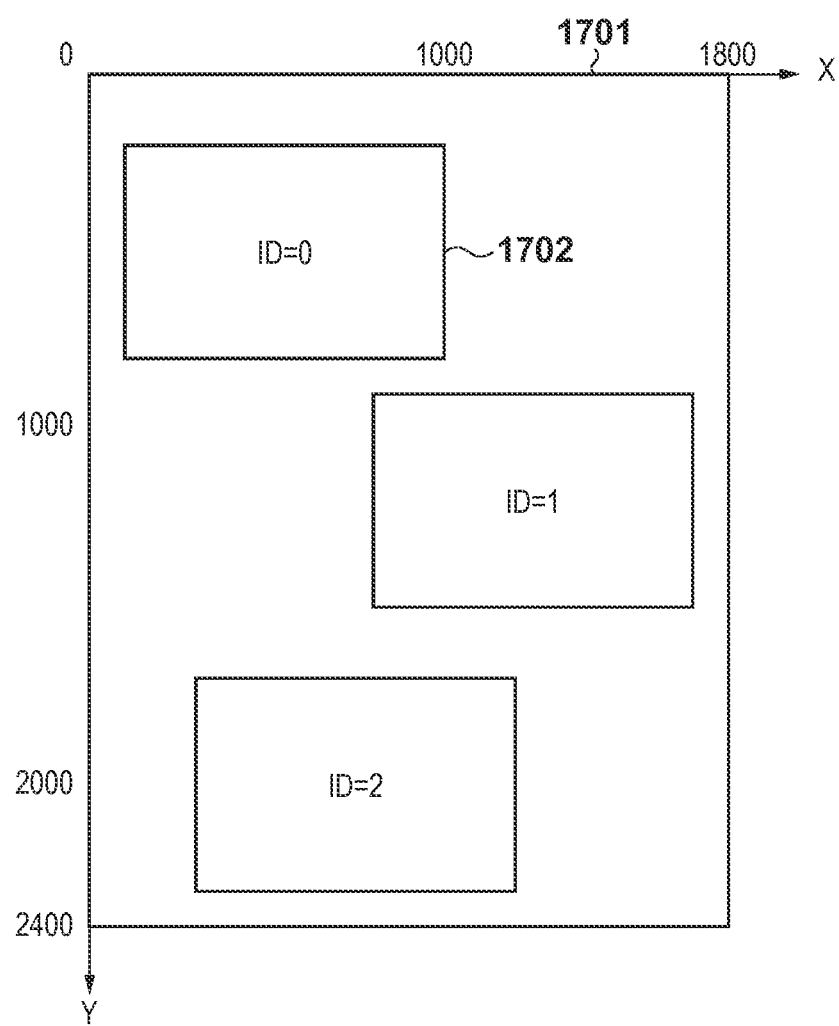
FIG. 17 is a view showing an example of a layout template.

For example, in the template shown in FIG. 17, all slots have a "rectangle" shape, as indicated by Shape tags in FIG. 18, and PersonGroup tags recommend that "MainGroup" is to be laid out as a person group name. In the template shown in FIG. 19, a slot 1902 which has an ID=0 and is laid out at the center has a rectangular shape, as described in FIG. 20. Also, a person group "SubGroup" is to be laid out. Other slots 1903 having IDs=1 and 2 have an "ellipse" shape, and it is recommended that a person group "MainGroup" is to be laid out.

This embodiment recommends that a large number of such templates are to be held.

<Proposal Scenario Determination (Including Solution Information)>

As described above, the application presented by this embodiment can execute the analysis processing for input images, and can automatically group persons to display them on the UI. The user who checks the results can input attribute information such as names and birthdays for respective person groups, and can set preference degrees and the like for respective images.

Furthermore, a large number of layout templates, which are classified for respective themes, can be held.

When the aforementioned conditions are satisfied, the application of this embodiment executes processing for automatically generating a collage layout that the user may like and presenting the layout to the user at a predetermined timing. This processing will be referred to as layout proposal processing hereafter. More specifically, when an OS of the information processing apparatus is activated, a resident application program is loaded from the secondary storage device onto the RAM, and is executed. Then, that resident application collects information associated with various dates and times in person and image databases, searches the collected information for dates and times, differences from the current date and time of which are not more than a pre-set threshold, and executes scenario proposal processing when such information is found.

FIG. 6 is a basic flowchart required to execute the proposal processing.

Referring to FIG. 6, in step S601, a scenario of proposal processing is determined. The scenario includes determination of a theme of a layout to be proposed and a template with reference to a database S602 and templates S604, settings of a person (main character) to be weighted heavily in the layout, and selection information of images used in layout generation.

For the sake of simplicity, examples of two scenarios will be described below.

For example, assume that a first birthday of a person "son", who is automatically grouped in FIG. 15, will be soon. In this case, a theme of a layout to be proposed is determined as a growth record "growth". Next, a template is selected. In this case, a template shown in FIG. 19 suited to the growth record is selected, and "growth" is described in a Theme tag of XML data, as shown in FIG. 30. Next, "son" is set as a main character "MainGroup" to be focused in layout processing. Also, "son" and "father" are set as "SubGroup" to be secondarily focused in the layout processing. Next, images used in the layout processing are selected. In case of this example, large quantities of images including "son" of those which have been captured since the birthday of the person "son" until now are extracted and listed with reference to the database S602. The scenario determination processing for the growth record layout has been described.

As an example different from the above case, when it is determined based on event information registered in FIG. 14 that large quantities of images of a family travel taken a few days ago are stored in the secondary storage device, the scenario determination unit determines a scenario required to propose a family travel layout. In this case, a theme of the layout to be proposed is determined as "travel". Next, a template is selected. In this case, a layout shown in FIG. 17 is selected, and "travel" is described in turn in a Theme tag of XML data, as shown in FIG. 30. Next, "son", "mother", and "father" are set as a main character "MainGroup" to be focused in layout processing. In this manner, by utilizing the characteristics of the XML data, a plurality of persons can be set as "MainGroup". Next, images to be used in the layout processing are selected. In case of this example, large quantities of images linked with the travel event are extracted and listed with reference to the database S602. The scenario determination processing for the family travel layout has been described.

<Layout Generation Processing (Selection & Layout of Images According to Layout Theme)>

Figure 21:
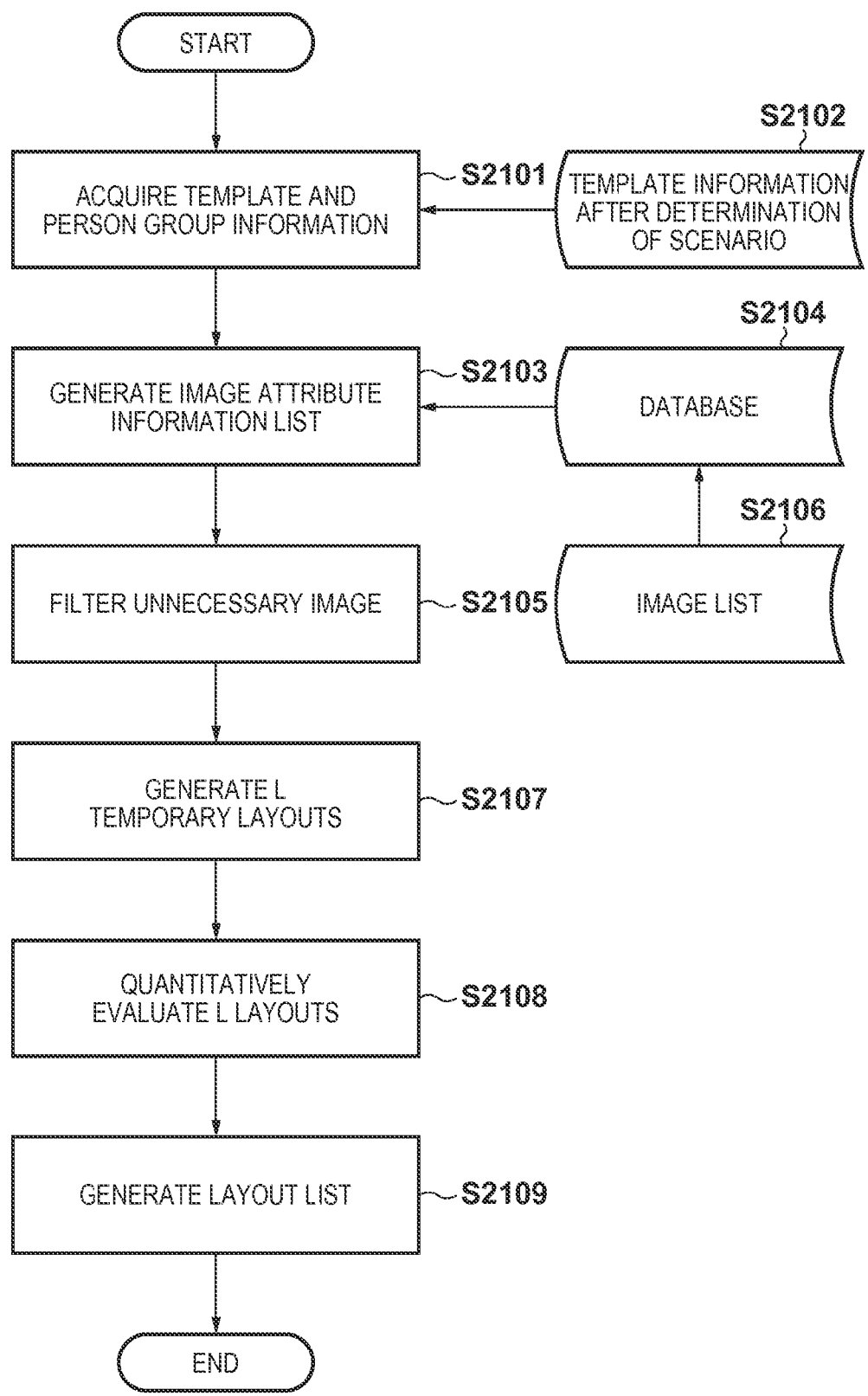
FIG. 21 is a flowchart of automatic layout generation processing according to the first embodiment.

Next, in step S603 in FIG. 6, automatic generation processing of the layout based on the aforementioned scenario is executed. FIG. 21 shows detailed processing sequence of the layout processing unit. Respective processing steps will be described below with reference to FIG. 21.

Referring to FIG. 21, template information S2102 which is determined in the aforementioned scenario generation processing and is set with the theme and person group information is acquired in step S2101.

In step S2103, feature amounts of each image are acquired from a database S2104 for respective images based on an image list S2106 determined by the scenario, thus generating an image attribute information list. The image attribute information list has a configuration in which IMAGEINFO tags shown in FIG. 11 are arranged as many as the number of images included in the image list. Then, automatic layout generation processing in steps S2105 to S2109 is executed based on this image attribute information list.

In this manner, in the automatic layout generation processing of this embodiment, attribute information, which is stored in the database by executing the sensing processing for each image in advance, is used without directly handing image data itself. This is to avoid requirement of a very huge memory area required to store images when image data themselves are used as targets upon execution of the layout generation processing.

Figure 22:
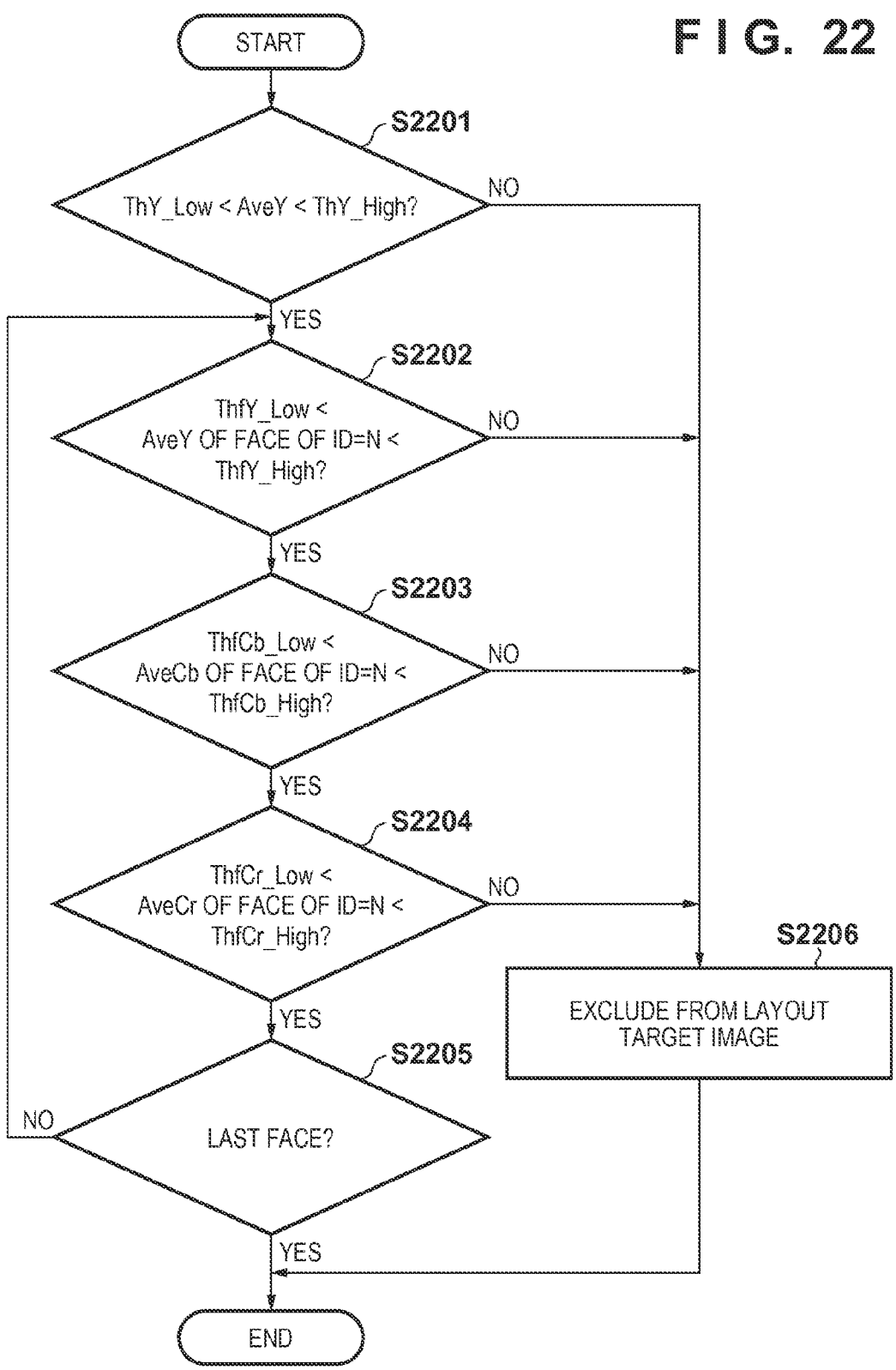
FIG. 22 is a flowchart of unnecessary image filtering processing according to the first embodiment.

Next, in step S2105, unnecessary images are filtered from the input images using the attribute information of the input images. The filtering processing is executed according to the sequence shown in FIG. 22. Referring to FIG. 22, it is determined in step S2201 for each image if an overall average luminance is included in a range between certain thresholds (ThY_Low and ThY_High). If NO in step S2201, the process advances to step S2206 to exclude an image of interest from layout targets.

Likewise, it is determined in steps S2202 to S2205 for each face region included in the image of interest whether or not an average luminance and average color difference components are included in a predetermined threshold range indicating a satisfactory flesh color region. Only an image for which YES is determined in all steps S2202 to S2205 is applied to the subsequent layout generation processing. Note that since this filtering processing is executed for the purpose of excluding images that are apparently judged to be unnecessary in the subsequent temporary layout generation processing, the thresholds are relatively moderately set. For example, when a difference between ThY_Low and ThY_High in the determination of the entire image luminance in step S2201 is extremely smaller than an image dynamic range, the number of images for which YES is determined is decreased accordingly. In the filtering processing of this embodiment, in order to avoid such a situation, the thresholds are set so that the difference between ThY_Low and ThY_High is set to be as large as possible, but apparently abnormal images can be excluded.

Next, in step S2107 in FIG. 21, using images selected as layout targets in the above processing, a temporary layout of a large number of (L) images is generated. The temporary layout is generated by repeating processing for arbitrarily applying input images to image layout frames of the acquired layout. At this time, the following parameters are randomly determined:

which image is to be selected from the images when the layout includes N image layout frames;

in which of layout frames a plurality of selected images are to be laid out; and a trimming ratio indicating a degree of trimming processing to be executed when images are laid out.

Figure 23:
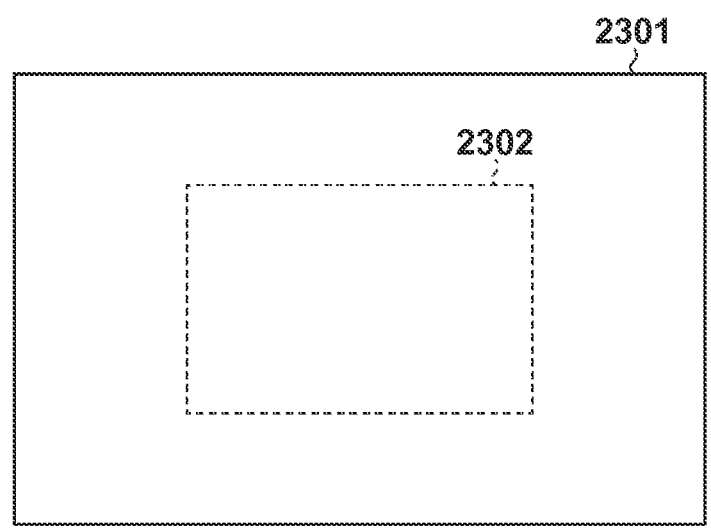
FIG. 23 is a view showing an example of automatic trimming processing.

In this case, the trimming ratio is expressed by, for example, a value ranging from 0 to 100%, and an image is trimmed with reference to its center, as shown in FIG. 23. In FIG. 23, reference numeral 2301 denotes an entire image; and 2302, a trimming frame upon trimming at the trimming ratio=50%.

Based on the aforementioned selected images, layouts, and trimming references, temporary layouts are generated as many as possible. Each generated temporary layout can be expressed like XML data shown in FIG. 31. An ID of an image which is selected and laid out in each slot is described using an ImageID tag, and a trimming ratio is described using a TrimingRatio tag.

Note that the number L of temporary layouts to be generated is determined according to the processing amount of evaluation processing in a layout evaluation step to be described later, and the performance of the information processing apparatus 115 which executes that processing. For example, assume that several hundred thousand different temporary layouts or more are prepared. Each generated layout may be appended with an ID, and may be stored as a file in the secondary storage device in the XML format shown in FIG. 31 or may be stored on the RAM using another data structure such as a structure.

Next, in step S2108 in FIG. 21, the L temporary layouts generated by the above processing are evaluated respectively using predetermined layout evaluation values. FIG. 24 shows a list of layout evaluation values in this embodiment. As shown in FIG. 24, the layout evaluation values used in this embodiment can be mainly classified into three categories.

Figure 25:
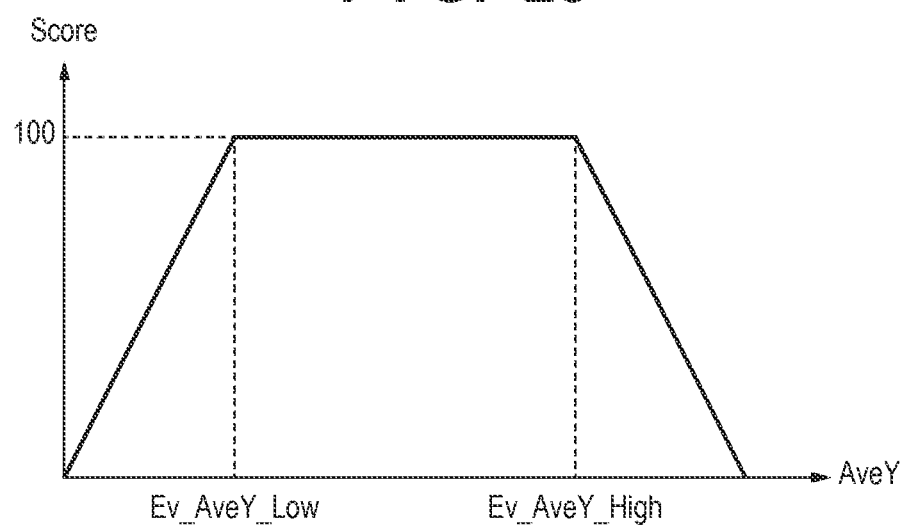
FIG. 25 is a graph for explaining a brightness adequate degree.
Figure 26:
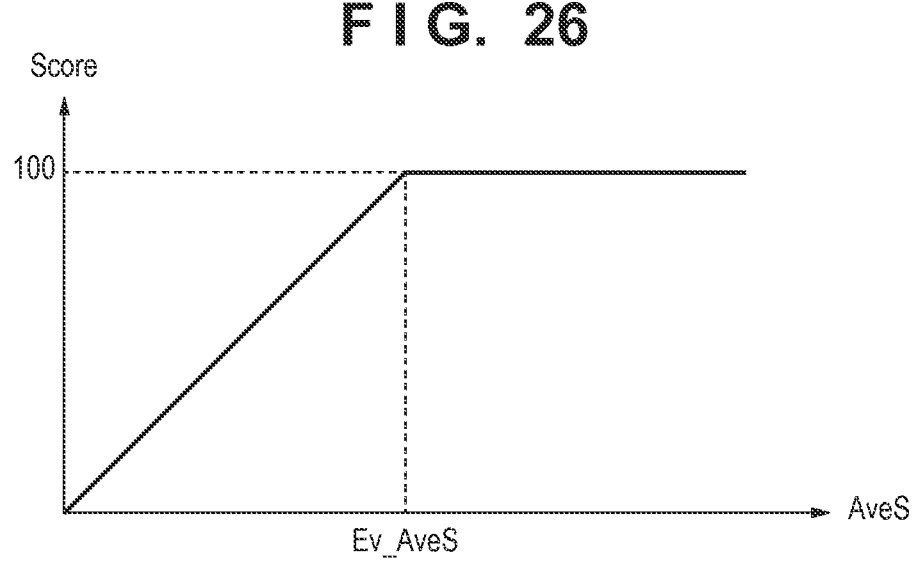
FIG. 26 is a graph for explaining a chroma saturation adequate degree.

The first category includes image-dependent evaluation amounts. States such as a brightness, chroma saturation, and blurred amount of an image are checked, and are converted into scores. Examples of scores will be described below. As shown in FIG. 25, a brightness adequate degree is set so that a score value=100 is given to an average luminance value within a predetermined range, and the score value is decreased when the luminance average deviates farther from the predetermined range. On the other hand, as shown in FIG. 26, a chroma saturation adequate degree is set so that a score value=100 is given when an average chroma saturation of an entire image is larger than a predetermined chroma saturation value, and the score value is gradually degreased when the average chroma saturation is smaller than the predetermined value.

The second evaluation category includes scores of evaluation of matching degrees between images and slots. For example, a person matching degree expresses a matching ratio between a person designated for a given slot and a person included in an image actually laid out in that slot. For example, assume that "father" and "son" are designated for a certain slot in PersonGroup designated in XML data. At this time, assuming that the above two persons are included in an image assigned to that slot, a person matching degree of this slot assumes a score value=100. If only one person is included, a matching degree assumes a score value=50. If none of the persons are included, a score value=0 is set. A matching degree in a page assumes an average value of matching degrees calculated for respective slots.

Figure 27:
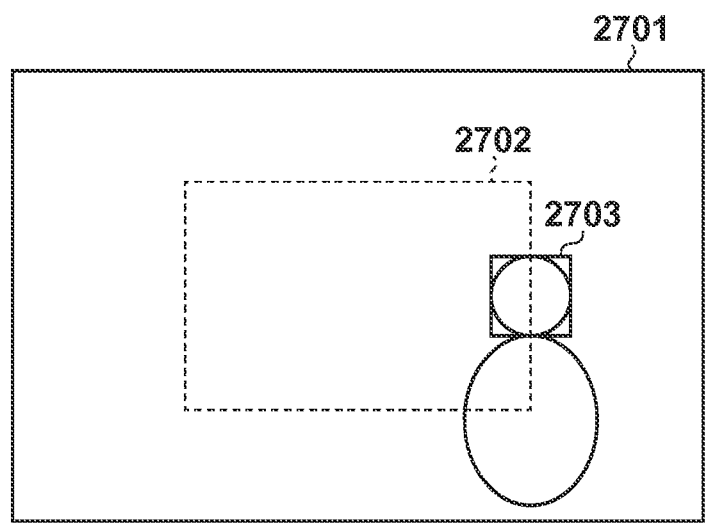
FIG. 27 is an explanatory view of trimming omission determination processing.

As another image/slot matching degree evaluation value, omission determination of a trimming region 2702 can be used. For example, when a position 2703 of a face included in an image is revealed, as shown in FIG. 27, a score value ranging from 0 to 100 is calculated according to an area of an omitted portion. When an omitted area is 0, a score value is 100; conversely, when a face region is fully omitted, a score value is 0.

The third evaluation category evaluates a balance in a layout page. FIG. 24 presents some evaluation values used to evaluate a balance.

An image similarity will be described first. Similarities of respective images are calculated for respective temporary layouts generated in large quantities. For example, when a layout having a theme "travel" is to be created, if only images having higher similarities, that is, only those that are similar to each other, are laid out, this layout is not good. For example, similarities can be evaluated based on captured dates and times. Images having close captured dates and times were more likely to be captured at similar places. However, when captured dates and times are largely different, places and scenes are more likely to be different. The captured dates and times can be acquired from pieces of attribute information for respective images, which are stored in advance in the database portion 202 as image attribute information, as shown in FIG. 11. Similarities are calculated from the captured dates and times by the following calculations. For example, assume that four images are laid out on a temporary layout of interest. At this time, among these four images, a shortest captured time interval value is calculated. For example, assume that 30 min are thirty minutes is the shortest interval. Letting MinInterval be this interval, and the interval is stored in a second unit. That is, 30 min=1800 sec. This MinInterval is calculated for each of the L, and is stored in a sequence stMinInterval[l]. Next, a maximum value MaxMinInterval of the stMinInterval[l] is calculated. Then, a similarity evaluation value Similarity[l] of an l-th temporary layout can be calculated by:

Similarity[$l$]=100×stMinInterval[$l$]/MaxMinInterval,

That is, the Similarity[l] is effective as an image similarity evaluation value, since it assumes a value that becomes closer to 100 as a minimum captured time interval is larger, and that which becomes closer to 0 as the interval is smaller.

Next, as an evaluation value used to evaluate a balance in a layout page, a tincture variation will be described below. For example, when a layout having a theme "travel" is to be created, if only images having similar colors (for example, blue of blue sky and green of mountains) are laid out, that layout is not good. Therefore, variances of average hues AveH of images included in an l-th temporary layout are calculated, and are stored as a tincture variation degree tmpColorVariance[l]. Next, a maximum value MaxColorVariance of the tmpColorVariance[l] is calculated. Then, a tincture variation evaluation value ColorVariance[l] of the l-th temporary layout can be calculated by:

ColorVariance[$l$]=100×tmpColorVariance[$l$]/MaxColorVariance

That is, the ColorVariance[l] is effective as a tincture variation degree evaluation value since it assumes a value which becomes closer to 100 as variations of the average hues of images laid out in a page are larger, and that which becomes closer to 0 as the variations are smaller.

Next, as an evaluation value used to evaluate a balance in a layout page, a variation degree of face sizes will be described below. For example, when a layout having a theme "travel" is to be created, if only images having similar face sizes are laid out by checking a layout result, that layout is not good. On a good layout, images having both small and large face sizes are laid out on a sheet surface after layout to have a good balance. In this case, variance values of face sizes (each of which is expressed by a distance of a diagonal line from an upper left position to a lower right position of a face region) of images laid out in an l-th temporary layout of interest are stored as tmpFaceVariance[l]. Next, a maximum value MaxFaceVariance of the tmpFaceVariance[l] is calculated. Then, a face size variation degree evaluation value FaceVariance[l] of the l-th temporary layout can be calculated by:

FaceVariance[$l$]=100×tmpFaceVariance[$l$]/MaxFaceVariance

That is, the FaceVariance[l] is effective as a face size variation degree evaluation value since it assumes a value which becomes closer to 100 as variations of face sizes laid out on a sheet surface are larger, and that which becomes closer to 0 as the variations are smaller.

As another category, user's preference evaluation may be used.

The plurality of evaluation values, which are calculated for each temporary layout, as described above, are integrated to obtain a layout evaluation value of that temporary layout. Let EvalLayout[l] be an integrated evaluation value of an l-th temporary layout, and EvalValue[n] be N evaluation values (respectively including evaluation values shown in FIG. 24), which are calculated, as described above. At this time, the integrated evaluation value can be calculated by:

EvalLayout[$l$]=ΣEvalValue[$n$]×$W$[$n$]

where Σ is an integral calculation symbol of n=0, 1, 2, . . . , N. Also, W[n] is a weight of each evaluation value for respective scenes shown in FIG. 24. The weights are characterized by setting different weights depending on themes of layouts. For example, as shown in FIG. 24, upon comparison between themes "growth" and "travel", many photos of various scenes, which photos have higher qualities as much as possible, are laid out for the theme "travel". For this reason, this theme tends to attach importance on image-dependent evaluation values and balance evaluation values in a page. On the other hand, whether or not a main character as a growth record target surely matches slots is more important for the theme "growth" than variations of images. For this reason, this theme tends to attach more importance on image/slot matching degree evaluation values than a balance in a page and image-dependent evaluation values. In addition, when a theme "favorite" is set, only user's preferences can be used as evaluation values.

Using the EvalLayout[l] calculated in this way, a layout list LayoutList[k] used to display layout results is generated in step S2109. The layout list stores identifiers l in descending order of evaluation value of the EvalLayout[l] for the predetermined number of (for example, five) layouts. For example, when a temporary layout corresponding to the highest score is a 50th (=l) temporary layout, LayoutList[0]=50. Likewise, after LayoutList[1], identifiers l of layouts having the second and subsequent score values are stored.

The processing according to the flowchart shown in FIG. 21 has been described.

<Rendering & Display>

Figure 29:
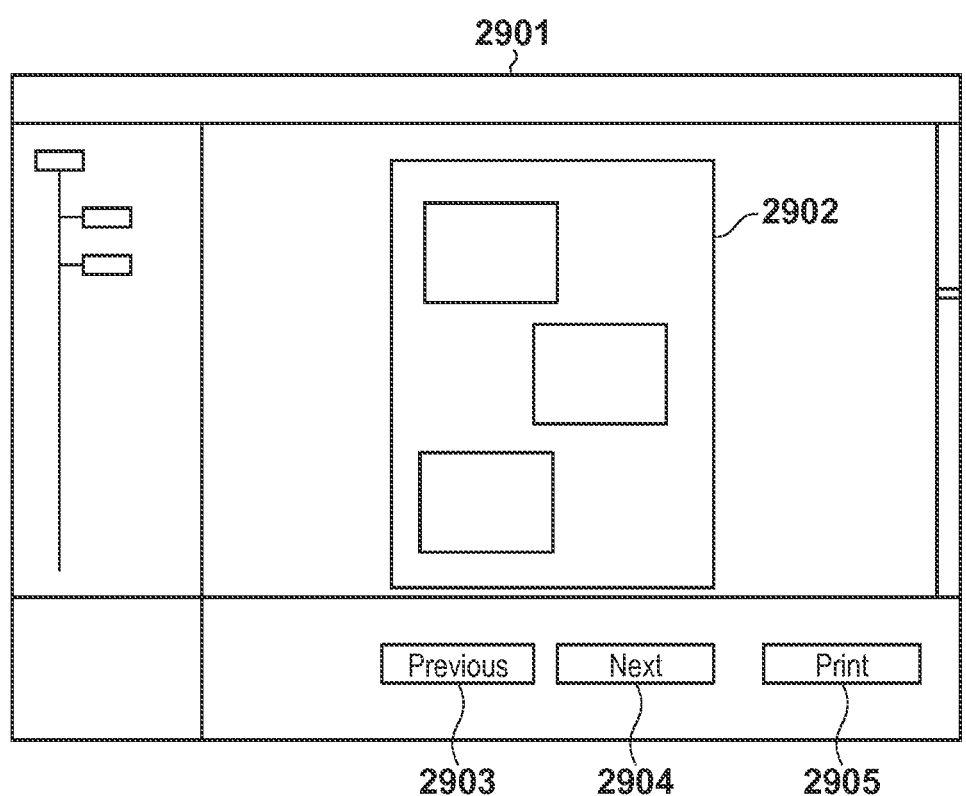
FIG. 29 is a view showing a display example of an automatic layout generation result.

The layout results obtained by the aforementioned processing are rendered in step S605 in FIG. 6, and the rendered results are displayed within a UI 2901 shown in FIG. 29. In step S605, a layout identifier stored in LayoutList[0] is read out, and a temporary layout result corresponding to that identifier is read out from the secondary storage device or RAM. The layout result is set with template information and image names assigned to respective slots included in the template. In step S605, the layout result is rendered using a rendering function of an OS, which runs on the information processing apparatus 115, based on these pieces of information, and is displayed like a layout frame 2902 in FIG. 29.

If pressing of a Next button 2904 in FIG. 29 is detected, that is, if the user designates to display another variation in step S606, an identifier stored in LayoutList[1] as the next highest score is read out, and a corresponding layout result is rendered and displayed in the same manner as described above. Thus, the user can browse proposal layouts of various variations. When the user presses a Previous button 2903, a previously displayed layout can be re-displayed. Furthermore, when the user likes the displayed layout, he or she can press a print button 2905 to print out the layout result 2902 from the printer 112 connected to the information processing apparatus 115.

The basic processing sequence of this embodiment has been described.

Figure 32:
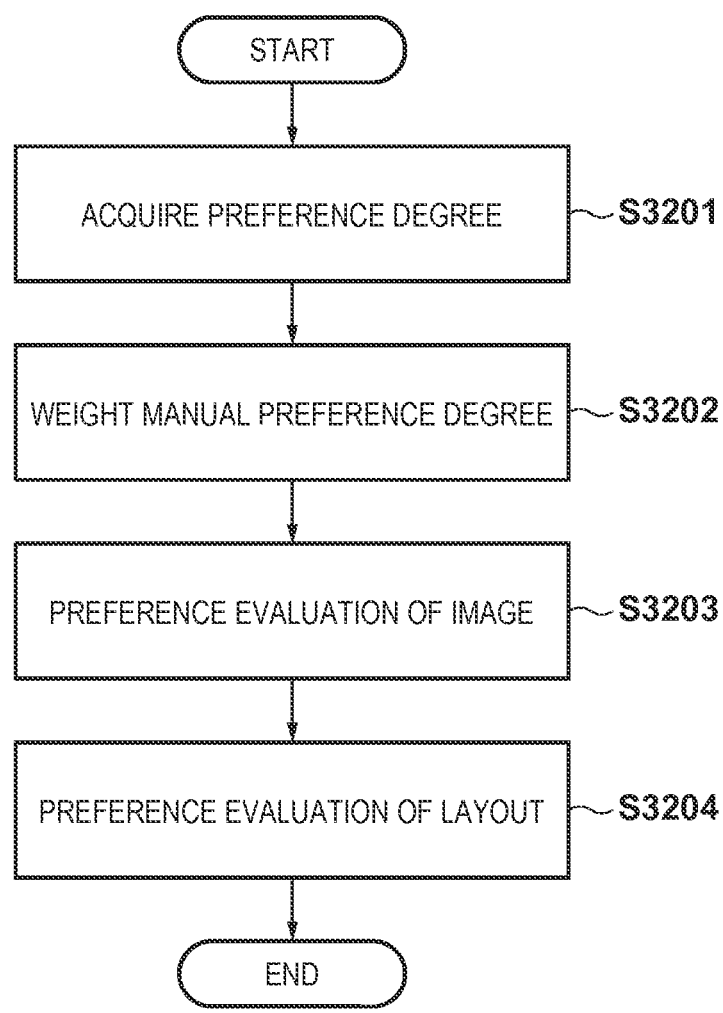
FIG. 32 is a flowchart of a user's preference evaluation processing.

Next, further detailed embodiments will be additionally described. That is, the preference evaluation method in layout evaluation executed in step S2108 of FIG. 21 will be described in detail below with reference to FIG. 32.

In step S3201, preference degrees of all images which remain after the filtering processing of unnecessary images in step S2105 of FIG. 21 are acquired. As shown in the example of the image attribute information of FIG. 12, the preference degrees include that which is manually set by the user, and that which is automatically set based on image information, and both of the preference degrees are acquired.

In step S3202, a reliability of manual preference degrees is determined, and the manual preference degrees are weighted in correspondence with the reliability. A ratio of images set with the manual preference degrees with respect to J images which remain after the filtering processing is calculated. Then, whether or not the manual preference degrees have a reliability is determined based on the ratio of images set with the preference degrees to determine a weight MW accordingly. For example, the ratio and weight shown in FIG. 33 are set. As the ratio of images set with manual preference degrees is larger, since the user steadily sets manual preference degrees, it is determined that these preference degrees are reliable, and a large MW value is set. As the ratio is smaller, since the user does not steadily set manual preference degrees, it is determined that these preference degrees are not reliable, and a small MW value is set.

Next, in step S3203, a user's preference evaluation per image is executed. Note that the MW value determined in previous step S3202 is used at this time. For example, when a manual preference degree has a score value=80, and an automatic preference degree has a score value=60, the value "80" is stored in the a manual preference degree ManualValue[j], and the value "60" is stored in an automatic preference degree AutoValue[j]. Then, the ManualValue[j] is multiplied by the weight determined in step S3202, and a total score value is determined as an image preference evaluation value ImgValue[j], which represents importance of an image. That is, the image preference evaluation value can be calculated by:

$$ImgValue[j]=ManualValue[j] \times MW+AutoValue[j].$$

Using this method, a final preference evaluation value of one image can be calculated. Also, after both the evaluation values ManualValue and AutoValue are set on the same scale ranging from 0 to 100, the MW always assumes a value larger than 1.0, thus calculating a preference evaluation value that attaches importance on the manual preference degree.

Note that the image preference evaluation value may be calculated using two weighting coefficients $\alpha$ and $\beta$ by:

$$ImgValue[j]=ManualValue[j] \times \alpha + AutoValue[j] \times \beta$$

However, when the manual preference degree is set to have a larger weight than the automatic preference degree (interest degree), $\alpha > \beta$, that is, $\alpha$ is set to be relatively larger than $\beta$. In this connection, the above equation corresponds to a case in which $\alpha > 1$ and $\beta = 1$.

Finally, a preference evaluation value for each layout is calculated in step S3204. A total value of evaluation values ImgValue[m] of M images on a l-th temporary layout is stored as tmpPalatability[l]. Next, a maximum value MaxPalatability of the tmpPalatability[l] is calculated. Then, a preference evaluation value Palatability[l] of the l-th temporary layout can be calculated by:

$$Palatability[l]=100 \times tmpPalatability[l]/MaxPalatability$$

That is, the Palatability[l] is effective as a layout preference evaluation value since it assumes a value which becomes closer to 100 as the total value of the preference evaluation values of all images laid out on a sheet surface is higher, and that which becomes closer to 0 as the total value is lower. By generating a layout using the layout preference evaluation value obtained by this method together with other layout evaluation values, a layout which attaches importance on the manual preference degrees and considers the user's preference can be generated.

Note that this embodiment has exemplified the case in which a user's preference evaluation is executed when large quantities of temporary layouts are generated and undergo layout evaluation. However, the present invention is not limited to this. For example, a method of executing the same method at the image filtering timing, and using only images having higher evaluation values as layout targets, may be used.

Second Embodiment

In the second embodiment, only differences from the first embodiment will be described. That is, the second embodiment will explain another reliability determination method in step S3202. In this method, a reliability is determined from correlations between manually set preference degrees and automatically set preference degrees to determine a weight.

Figure 35:
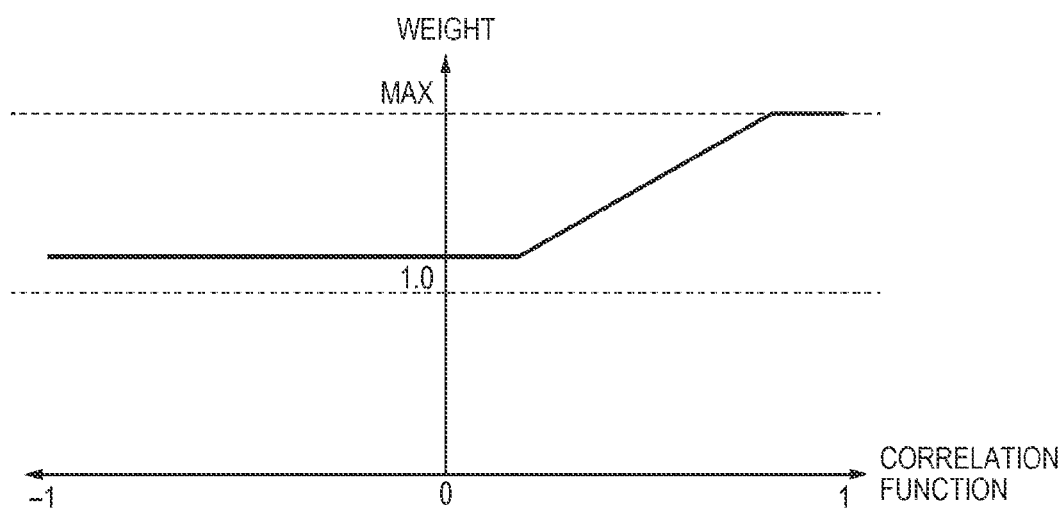
FIG. 35 is a graph showing a correspondence example between a correlation coefficient and weight.

After image preference degrees are acquired, correlations between manual preference degrees and automatic preference degrees of all images are calculated. For example, assume that acquired images are plotted, as shown in FIG. 34. In order to determine whether or not these image preference degrees have correlations, a correlation coefficient r is calculated. Since the correlation coefficient can be calculated by a normally used equation, a detailed description thereof will not be given. As a result of calculation of the correlation coefficient, when r has a positive correction, it is determined that preference degrees are reliable, and a weight MW is determined accordingly. The correlation coefficient and the weight MW are a correlation coefficient and a corresponding weight shown in, for example, FIG. 35. By determining correlations in this way, similarities between manual values and automatic values set for all images can be revealed. With this method, when manual preference degrees are not set, whether or not the user purposely does not set the preference degrees can be judged. If there is no correlation, the user is likely to quit to set manual preference degree or to merely half-heartedly set them, and such preference degrees are not reliable. After that, the same method as in the first embodiment is executed to generate a layout which considers user's preferences.

Figure 36:
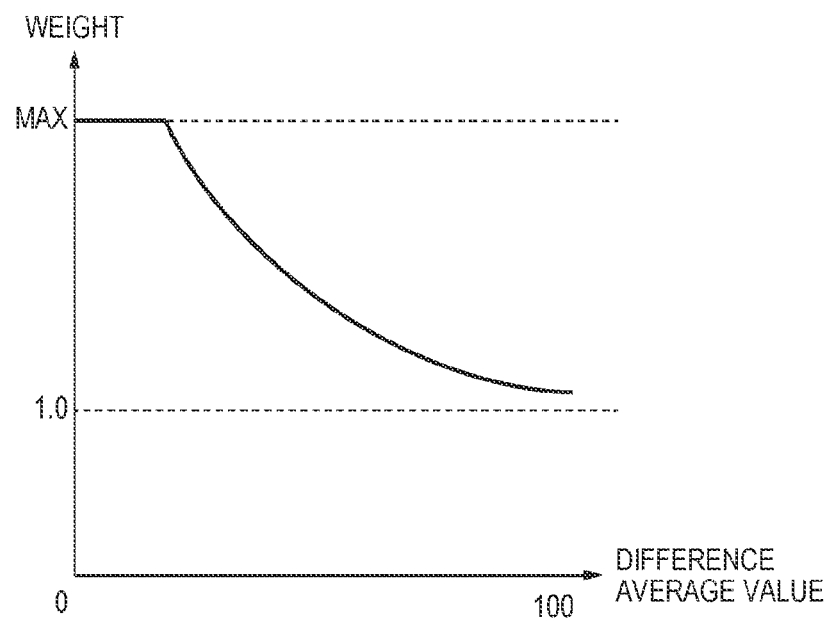
FIG. 36 is a graph showing a correspondence example between a difference average value and weight.

This method sticks to use correlations, but the correlation calculation method is not limited to that described above. For example, the following method may be used. That is, differences between manual and automatic values may be calculated for respective images, and an average value of differences of all images is calculated. Then, when the average value is low, it is determined that these values are correlated, so as to set a weight shown in, for example, FIG. 36 in correspondence with the average value.

Third Embodiment

The third embodiment will also explain another reliability determination method in step S3202. In this method, a reliability is determined based on variations of manually set preference degrees so as to determine a weight.

Figure 37:
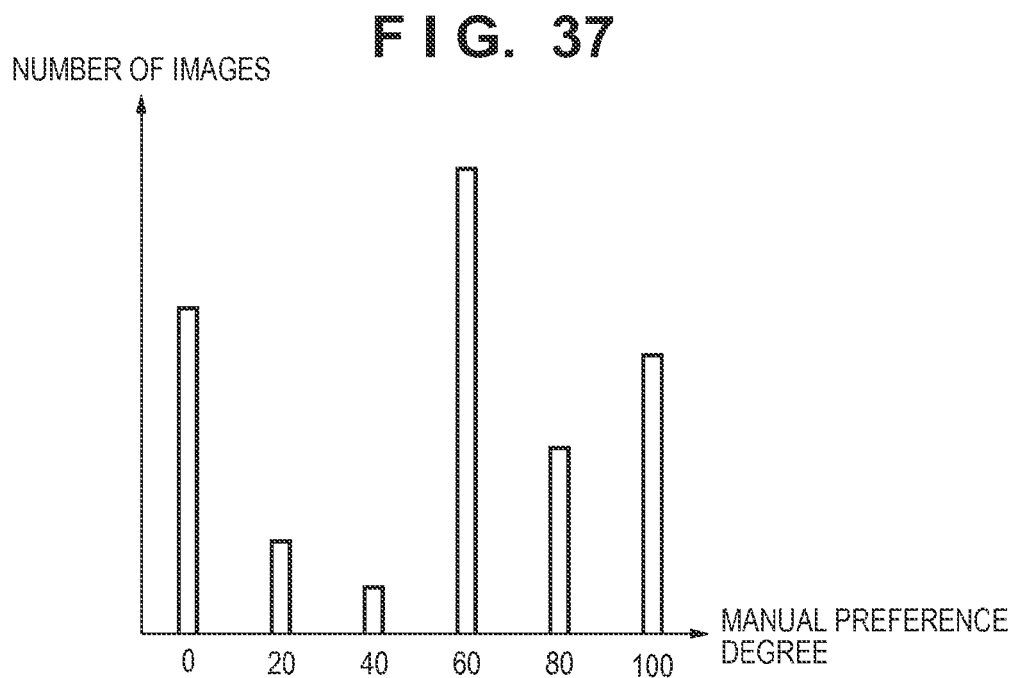
FIG. 37 is a graph showing an example of manual preference degrees of input images.
Figure 38:
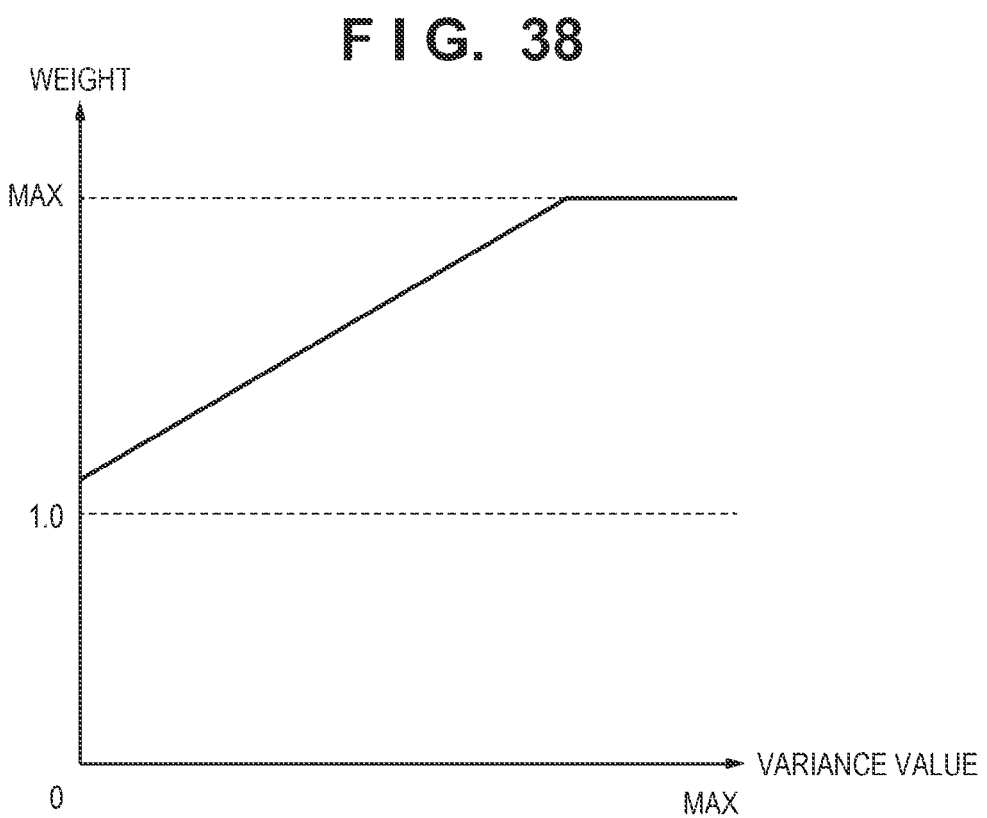
FIG. 38 is a graph showing a correspondence example between a variance value and weight.

After image preference degrees are acquired, a variance of manually set preference degree values of all images is calculated. For example, assume that acquired images form a graph shown in FIG. 37. A variance value v is calculated so as to determine whether or not the manual preference degrees of these images have variations. Since a variance can be calculated by a normally used equation, a detailed description thereof will not be given. As a result of calculation of the variance, when a large value v is obtained, it is determined that the manual preference degrees are reliable, and a weight MW is determined accordingly. For example, a variance and corresponding weight are set, as shown in FIG. 38. Using the variance value in this way, a variation degree of manual values set for all images can be revealed. If the variance value is low, manually set preference degrees are biased. Since the user may not set preference degrees for most of images or he or she does not have any steady criteria of preference degrees, and may set, for example, ★3 (score=60), it is judged that the preference degrees are not reliable. After that, the same method as in the first embodiment is executed to generate a layout which considers user's preferences.

This method sticks to using variations of manually set preference degrees, and the variation calculation method is not limited to that described above. For example, a method of similarly determining a weight MW using, for example, a standard deviation can be easily hit upon. In place of variations of preference degree values, those of set values may be used to determine that the values are reliable as variations are smaller to set a higher weight MW.

Fourth Embodiment

The fourth embodiment will also explain another reliability determination method in step S3202. In this method, a reliability is determined using captured dates and times to determine a weight.

Figure 39:
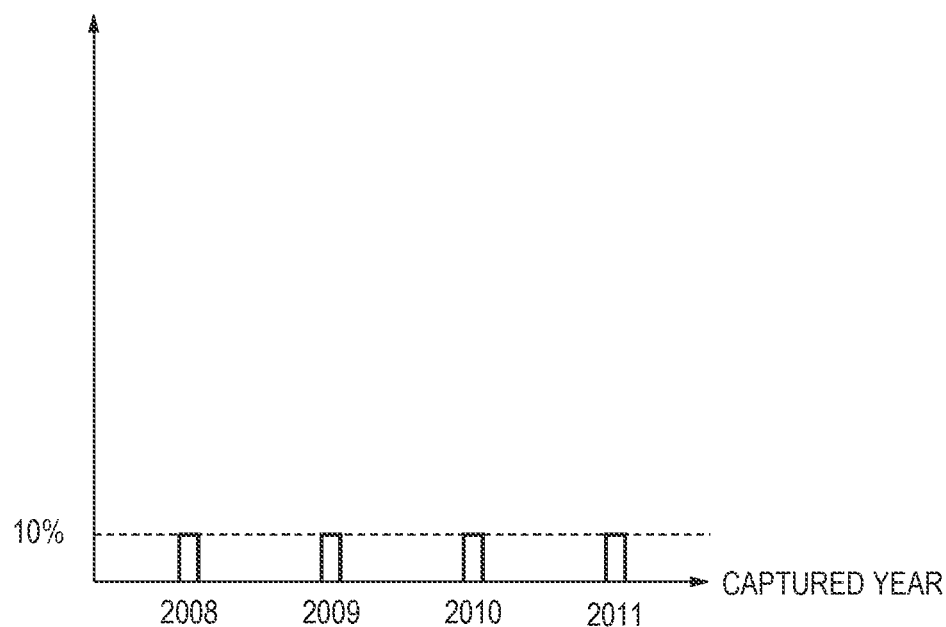
FIG. 39 is a graph showing an example of setting ratios of manual preference degrees for respective captured years.
Figure 40:
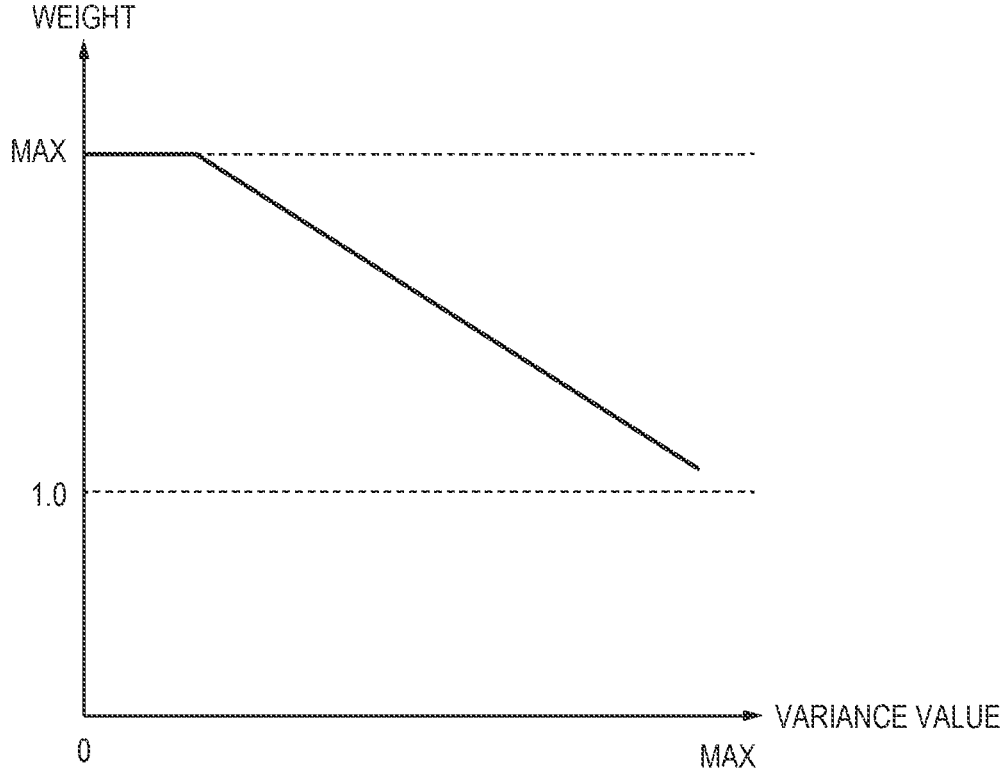
FIG. 40 is a graph showing a correspondence example between a variance value of ratios and weight.

After image preference degrees are acquired, image captured dates and times recorded in Exif (Exchangeable Image File Format) data are also acquired. Then, all the images are sorted for respective captured years, and ratios of frequencies of images set with manual preference degrees are calculated for respective captured years. For example, assume that acquired images were captured in 2008 to 2011 as shown in FIG. 39, and ratios of manually set preference degrees of all the years are 10%. At this time, a variance value v of the ratios of images manually set with preference degrees for respective captured years is calculated. As a result of calculation of the variances, as the value v becomes smaller, it is determined that manual preference degrees are reliable, and a weight MW is determined accordingly. For example, a variance value and corresponding weight are set, as shown in FIG. 40. When the ratios of all the years are 10%, since the variance value v becomes 0, a weight MW becomes maximum. If the user carefully selects images and sets preference degrees, the number of set images is small. Hence, by merely using an overall ratio, it is hardly differentiated from a case in which the user quits to set preference degrees along the way. However, using this method, even when the number of set images is small, if the user persistently sets preference degrees, no considerable differences appear between captured years, and it is determined that manual preference degrees are reliable. After that, the same method as in the first embodiment is executed to generate a layout which considers user's preferences.

This method sticks to using captured dates and times of images, and the method of using captured dates and times is not limited to that described above. For example, a reliability may be determined simply based on variations of the numbers of set images in place of variations of ratios to determine a weight MW.

In the aforementioned embodiments, output target images are determined using both an output history (browse count) in accordance with user designations and user's evaluation values (preference degrees). For this reason, output target images can be appropriately determined. Note that the output history is not limited to the browse count, but it may be a print count of images. Also, the present invention is not limited to the count, but an output condition may be used. The output condition includes a print count when an image is printed. For example, based on a type of paper used in printing, a user's preference degree for an image may be automatically calculated.

Other Embodiments

The aforementioned embodiments are means for obtaining effects of the present invention, and other similar methods and different parameters may be used to obtain the same effects of the aforementioned embodiments. Furthermore, a plurality of embodiments may be combined.

Also, the present invention is applicable to a system configured by a plurality of devices (for example, a host computer, an interface device, a reader, a printer, etc.) or an apparatus (for example, a printer, a copying machine, a facsimile apparatus, etc.) including a single device.

This embodiment can also be achieved as follows. Initially, a storage medium (or a recording medium) that records a program code of software required to implement the functions of the aforementioned embodiment is supplied to a system or an apparatus. Next, a computer (or a CPU or an MPU) of that system or apparatus can read out and execute the program code stored in the storage medium. In this case, the program code itself read out from the storage medium implements the functions of the aforementioned embodiment, and the storage medium that stores the program code configures the present invention. Not only are the functions of the aforementioned embodiment implemented when the computer executes the readout program code. For example, an operating system (OS) that runs on the computer executes some of or all of actual processes based on an designation of the program code, thereby implementing the functions of the aforementioned embodiment. Such a case is included in the present invention.

Furthermore, the program code read out from the storage medium is written in a memory included in a function expansion card inserted into the computer or a function expansion unit connected to the computer. After that, based on a designation of the program code, a CPU, or the like, included in the function expansion card or unit, executes some of or all of actual processes, thereby implementing the functions of the aforementioned embodiment. Such a case is also included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
 a storage device that can store a plurality of images;
 a memory configured to store a program; and
 a processor configured to execute the program stored in the memory, wherein the processor (i) selects randomly N images from a plurality of images that are stored in the storage device, (ii) for each of the selected N images, determines randomly a layout area, among N layout areas in a template, in which one image is laid out in one layout area, wherein the random selecting of the N images and the random determining of the layout areas for the selected N images are executed multiple times, whereby a plurality of pages of the selected N images are laid out in the N layout areas, are generated by the random selecting and the random determining executed multiple times, (iii) evaluates the plurality of pages, based on information relating to an omitted portion of a face included in each of the N images, wherein the omitted portion of the face is a portion out of the layout area, (iv) determines a page from the plurality of pages, based on an evaluation for each of the plurality of pages, and (v) outputs the determined page.

2. A method performed by a processor by executing a program stored in a memory, the method comprising:
 selecting randomly N images, from a plurality of images that are stored in a storage device;

for each of the selected N images, determining randomly a layout area, among N layout areas in a template, in which one image is laid out in one layout area, wherein the random selection of the N images from the plurality of images and the random determining of the layout areas are executed multiple times, whereby a plurality of pages in which the selected N images are laid out in the N layout areas, are generated by the random selecting and the random determining executed multiple times;

evaluating the plurality of pages, based on information relating to an omitted portion of a face included in each of the N images, wherein the omitted portion of the face is a portion out of the layout area;

determining a page from the plurality of pages, based on an evaluation for each of the plurality of pages; and outputting the determined page.

3. The method according to claim 2, wherein, in the outputting, the plurality of pages are output according to an order that follows an evaluation for the plurality of pages in the evaluating.

4. The method according to claim 2, wherein, in the step of selecting randomly N images, a scenario is determined, and the N images are selected from a plurality of images that corresponds to the determined scenario.

5. The method according to claim 4, further comprising generating person groups, each of which corresponds to a person included in one or more images stored in the storage device, by analyzing images stored in the storage device,
wherein a scenario corresponding to a person group among the person groups is determined, and N images are randomly selected, from the plurality of images including a person of the person group corresponding to the determined scenario.

6. The method according to claim 5, wherein, in the generating of person groups, a first face feature amount corresponding to a first person group is stored in a database, and
in a case when a second face feature amount of a face image is similar to the first face feature amount, the second face feature amount is additionally stored to the first person group, and
in a case when the second face feature is not similar to the first face feature amount, the second face feature amount is additionally stored to the database as a new person group.

7. The method according to claim 4, wherein a scenario corresponding to a theme is determined, and a template corresponding to the theme is selected.

8. The method according to claim 7, wherein an event is designated to an image in the storage device, as the theme.

9. The method according to claim 2, further comprising generating a list indicating attribute information of each of the plurality of images, the attribute information indicating the first information and the second information,
wherein the N images are randomly selected from the plurality of images, based on the generated list.

10. The method according to claim 2, wherein the storage device stores attribute information of each of the plurality of images, wherein the attribute information includes, for each image, a first value in a multi-valued form as the first information and a second value in a multi-valued form as the second information for each image, the first value indicating a favorite ratio of a user and being manually inputted by the user, and the second value indicating how many times the image is accessed in the past and being updated automatically when the image is accessed.

11. The method according to claim 2, wherein, in the evaluating, the plurality of pages are evaluated by calculating, for each of the N layout areas included in one page, a score in accordance with an area of the omitted portion of the face out of the layout so that a score of a layout area in which a face in an image is not omitted is higher than a score of a layout area in which a face in an image is omitted.

12. The method according to claim 2, further comprising selecting the template among a plurality of templates, the template including the N image layout areas in a page.

13. The method according to claim 12, wherein, in the evaluating, each page is evaluated by multiplying values indicated by the first information associated with the images in the page by a weight greater than values indicated by the second information associated with the images in the page.

14. The method according to claim 13, wherein, in the evaluating, the weight is determined according to a correlation between the values indicated by the first information and the values indicated by the second information of the plurality of images stored in the storage device.

15. The method according to claim 12, wherein, in the evaluating, values indicated by the first information for each of the N images in each of the plurality of generated pages, are determined based on a user's evaluations for another image among the plurality of images, which is indicated by the first information.

16. The method according to claim 15, wherein, in the evaluating, the values indicated by the first information are determined according to the number of images evaluated by the user among the plurality of images.

17. The method according to claim 15, wherein, in the evaluating, the values indicated by the first information are determined according to a variance of the user's evaluations, which correspond to the plurality of images and are indicated by the first information.

18. The method according to claim 12, wherein the second information indicates output counts of each of the N images in each of the plurality of generated pages, as the history.

19. The method according to claim 12, wherein, in the evaluating, a page is evaluated, according to the first information, the second information, the third information, and fourth information indicating an analysis result of the face.

20. The method according to claim 2, wherein, in the evaluating, the plurality of pages are evaluated, based on the information, first information corresponding to a user's evaluations for each of N images in each of the plurality of pages, and second information based on output histories of each of N images in accordance with a user's designation in each of the plurality of pages.

21. The method according to claim 2, further comprising determining similarity of the N images, wherein, in the evaluating, the plurality of pages are evaluated, based on the information and determined similarity of the N image.

22. The method according to claim 21, wherein, in the determining of similarity of the N image, the similarity of the N images is determined based on captured dates of time of the N images.

23. The method according to claim 22, wherein, in the evaluating, the plurality of pages are evaluated so that a page whose similarity of the N images is determined as low is higher than a page whose similarity of the N image is determined as high.

24. The method according to claim 2, further comprising determining a color variation in the N images, wherein, in the evaluating, the plurality of pages are evaluated, based on the information and determined color variation in the N images.

25. The method according to claim 24, wherein, in the evaluating, the plurality of pages are evaluated so that a page whose color variation is determined as high is higher than a page whose color variation is determined as low.

26. The method according to claim 2, further comprising determining a variation degree of face sizes in the N images, wherein, in the evaluating, the plurality of pages are evaluated, based on the information and determined a variation degree of face sizes in the N images.

27. The method according to claim 26, wherein, in the evaluating, the plurality of pages are evaluated so that a page whose variation degree of face sizes is determined as high is higher than a page whose variation degree of face sizes is determined as low.

28. A non-transitory computer-readable storage medium storing a program for controlling a computer to execute respective steps of a method, the method comprising:

selecting randomly N images, from a plurality of images that are stored in a storage device;

for each of the selected N images, determining randomly a layout area among N layout areas in a template, in which one image is laid out in one layout area, wherein the random selecting of the N images and the random determining of the layout areas are executed multiple times, whereby a plurality of pages, in which the selected N images are laid out in the N layout areas, are generated by the random selecting and the random determining executed multiple times;

evaluating the plurality of pages, based on information related to an omitted portion of a face included in each of N images, wherein the omitted portion of the face is a portion out of the layout area;

determining a page from the plurality of pages, based on an evaluation for each of the plurality of pages; and outputting the determined page.

* * * * *